(12) United States Patent
Takahashi

(10) Patent No.: US 7,730,814 B2
(45) Date of Patent: Jun. 8, 2010

(54) VIDEO IMAGE TYPE DETERMINATION SYSTEM, VIDEO IMAGE PROCESSING SYSTEM, VIDEO IMAGE PROCESSING METHOD AND VIDEO IMAGE PROCESSING PROGRAM

(75) Inventor: Yusuke Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 866 days.

(21) Appl. No.: 10/587,423

(22) PCT Filed: Jan. 7, 2005

(86) PCT No.: PCT/JP2005/000103

§ 371 (c)(1),
(2), (4) Date: Jul. 26, 2006

(87) PCT Pub. No.: WO2005/076751

PCT Pub. Date: Aug. 25, 2005

(65) Prior Publication Data

US 2007/0160291 A1    Jul. 12, 2007

(30) Foreign Application Priority Data

Jan. 26, 2004    (JP)    ............................. 2004-016946

(51) Int. Cl.
*G06K 9/00* (2006.01)
(52) U.S. Cl. ...................... 82/104; 382/103; 382/106; 382/107; 382/181
(58) Field of Classification Search ................. 382/103, 382/104, 106, 107, 181
See application file for complete search history.

(56) References Cited

U.S. PATENT DOCUMENTS

| | | | |
|---|---|---|---|
| 4,926,346 A | 5/1990 | Yokoyama | |
| 5,128,874 A | 7/1992 | Bhanu et al. | |
| 5,638,116 A * | 6/1997 | Shimoura et al. | 348/118 |
| 6,950,535 B2 | 9/2005 | Sibayama et al. | |
| 7,049,945 B2 * | 5/2006 | Breed et al. | 340/435 |
| 2003/0214576 A1 | 11/2003 | Koga | |

FOREIGN PATENT DOCUMENTS

| | | |
|---|---|---|
| CN | 1366765 A | 8/2002 |
| EP | 0 436 213 A2 | 7/1991 |
| EP | 1 362 742 A1 | 11/2003 |
| JP | 06-70218 | 3/1994 |

(Continued)

OTHER PUBLICATIONS

T. Ueda et al., Digest Creation of Video Data recorded by Wearable Camera using Location and Geographical Information, Technical Report of the Institute of Electronics, Information and Commuication Engineers, vol. 101, No. 193 (DE2001-101), pp. 175-182, Jul. 2001.
European Search Report dated Dec. 21, 2009.

*Primary Examiner*—Tom Y Lu
(74) *Attorney, Agent, or Firm*—Scully, Scott, Murphy & Presser, P.C.

(57) ABSTRACT

A video image processing system, which determines a type of a video image scene and processes the video image based on a processing method corresponding to the type of the video image scene, is provided. A landmark feature variable obtaining section calculates the landmark feature variable on the basis of the photographing direction, the photographing position, and the landmark information. A moving feature variable obtaining section calculates a moving feature variable on the basis of the photographing position, the moving speed and route information. A video image type determining section determines a type of the video image scene on the basis of the landmark feature variable and the moving feature variable. A video image processing section determines a processing method of the video image on the basis of the type of the video image scene and a usage purpose, and processes the video image on the basis of the determined processing method. A display section displays the processed video image.

19 Claims, 11 Drawing Sheets

FOREIGN PATENT DOCUMENTS

| | | |
|---|---|---|
| JP | 07-288725 | 10/1995 |
| JP | 08-95596 A | 4/1996 |
| JP | 2000-92386 A | 3/2000 |
| JP | 2000-224462 A | 8/2000 |
| JP | 2002-142189 A | 5/2002 |
| JP | 2002-271733 A | 9/2002 |
| JP | 2002-330393 A | 11/2002 |
| JP | 2002-344789 A | 11/2002 |
| JP | 2003-87712 A | 3/2003 |
| JP | 2003-189230 A | 7/2003 |
| JP | 2003-199085 A | 7/2003 |
| JP | 2003-323430 A | 11/2003 |

\* cited by examiner

Fig. 12

| USAGE PURPOSE CATEGORY | TURNING CORNER/ JUNCTION | LANDMARK | TRAFFIC CONGESTION | SIGNAL WAITING | OTHER |
|---|---|---|---|---|---|
| GRASP OF ROUTE | SLOW REPLAY/ GUIDANCE INSTRUCTION DISPLAY | WITH TICKER | SCENE CUT | SCENE CUT | HIGH-SPEED REPLAY |
| SIGHTSEEING | SCENE CUT | SLOW REPLAY/ WITH TICKER | SCENE CUT | SCENE CUT | SCENE CUT |
| OBSERVATION | SLOW REPLAY | | | | HIGH-SPEED REPLAY |

VIDEO IMAGE TYPE DETERMINATION SYSTEM, VIDEO IMAGE PROCESSING SYSTEM, VIDEO IMAGE PROCESSING METHOD AND VIDEO IMAGE PROCESSING PROGRAM

TECHNICAL FIELD

The present invention relates to a technique to process a video image of a mobile camera. Particularly, the present invention relates to a video image processing system, a video image processing method and a video image processing program for determining the type of the video image contents and processing the video image. The present invention also relates to an video image type determination system, a video image type determination method and a video image type determination program for determining the type of the video image contents. The present invention further relates a server and a terminal of the video image processing system.

BACKGROUND ART

A mobile camera such as a ubiquitous camera is always carried by a photographer or mounted on a vehicle. In this case, video images are not intentionally taken by the photographer, but sequence video images of ordinary actions of the photographer are unintentionally taken. Therefore, the video images taken by the mobile camera often contains scenes which are not considered as important to a user. It is demanded to realize a system for effectively browsing the video images taken by the mobile camera.

Japanese Laid Open Patent Application JP-P2000-92386A discloses a browsing system for video images of a mobile camera. FIG. 1 is a block diagram showing an example of a configuration of the browsing system for the video images of the mobile camera according to conventional technique. As shown in FIG. 1, this browsing system includes a video image replay section 902, a current position control section 903, an area importance level control section 904, a video image omission section 905 and an video image display section 906. The video image replay section 902 replays the video images of the mobile camera. The current position control section 903 controls where the current position of the replayed video image is located in a moving space. The moving space is divided into a couple of areas, in which the importance level is provided for each area. The area importance level control section 904 controls how important the respective areas are and calculates the importance level of the area to which the current position belongs. The video image omission section 905 omits the video image in accordance with the importance level of a unit area when the video image is replayed. The video image display section 906 displays the video images which is normally replayed or replayed through the omission.

Another browsing system is also disclosed in "T. Ueda et al., "Digest Creation of Video Data recorded by Wearable Camera using Location and Geographical Information", Technical Report of the Institute of Electronics, Information and Communication Engineers, Vol. 101, No. 193 (DE2001-101), pp. 175-182, July 2001". According to this video image processing system, the importance level of a scene is calculated by a distance and a direction between a photographing position and a landmark so that a scene whose importance level is higher than a predetermined threshold value is exclusively extracted and provided.

According to the above mentioned conventional browsing system, the importance level of the video image is detected on the basis of the photographing position. Consequently, a scene with the high importance level is exclusively extracted, and the replay speed is changed in accordance with the importance level.

In the case of using the ubiquitous camera and the like, the video image is not intentionally taken by the photographer, but sequence video image of the ordinary actions of the photographer are unintentionally taken. Therefore, when the unedited video image is replayed, a person browsing the video image may have an unpleasant impression. For example, in the video image which was taken when the photographer significantly changed a line of sight leftward and rightward or when a car was turning to right or left, there is a large sway of the video images between left and right. Such a video image scene may give an unpleasant impression to the browsing person when it is replayed at high speed. There is also a case that a scene having no variations such as a traveling scene in traffic congestion makes the browsing person feel bored when it is replayed at low speed.

An important scene in the video image by the mobile camera is not determined only by a relative position against an object. Since a photographic device itself is moving, there is a case that moving information itself has a profound relationship with the important scene. Because actions such as turning and making a stop on the street contain an intention of a walker or a car driver, the importance level of the video image is increased in the case of turning and making a stop on the street.

However, in the above described conventional browsing system, the importance level is determined simply on the basis of the distance/direction between the photographing position and the landmark. Therefore, it is impossible for the conventional browsing system to appropriately determine a detailed type of the video image scene. It is impossible to appropriately replay the video image in accordance with the type of the video image scene either.

Moreover, the criteria of the importance level in the moving video image is changed based on the purpose to browse the video image by the browsing person. Since the criteria to determine the importance level is fixed in the conventional browsing system, it is difficult to correspond to the change of the purpose by the browsing person. For example, when the purpose is to confirm a route to reach a destination, the video image of a whole route is important and a scene to turn the corner and the like is particularly the most important. Meanwhile, when the purpose is to review the video image of a drive in the past, the landmark such as a mountain and a building which were along the road is important.

The following techniques are known as conventional techniques related to the process of the video images.

An video image processing device disclosed in Japanese Laid Open Patent Application JP-P2002-142189A includes an input means, an evaluation means and a processing means. The input means inputs a data stream having moving video image data. The evaluation means divides the moving video image data into a plurality of scenes and evaluates the moving video image data in the respective scenes according to a plurality of conditions which are mutually different. The processing means selects the scenes based on the evaluation result by the evaluation means.

Japanese Laid Open Patent Application JP-P2002-271733A discloses a device to generate a digested video image of a soccer game. This digest generating device divides the video image of a soccer game into a plurality of time zones and determines the state of each team (offensive state, defensive state, etc.) in each time zone to generate information indicating the progress of a match. The digest generating device then extracts the video image scene by using the generated information and the importance level.

Japanese Laid Open Patent Application JP-P2002-330393A discloses a video image digest generating method to determine importance of significance at a point of time on the video image of a program and dynamically calculate the importance level while receiving information additive to the program. Japanese Laid Open Patent Application JP-P2003-87712A also discloses a method for generating a digested sports video image which is capable of capturing a progress of the match and determining the importance level of phenomena.

Japanese Laid Open Patent Application JP-P, Heisei 08-95596A discloses a method capable of grasping the outer shell and the atmosphere of the video image and sound in a short period of time by using sound information. This method includes step for inputting video image information composed of video image information and sound information, step for extracting various kinds of feature variables from the sound information among the inputted video image information, step for processing the video image information based on the extracted feature variables, and step for outputting the generated video image information by the processing.

DISCLOSURE OF INVENTION

An object of the present invention is to provide a video image type determination system, a video image type determination method and a video image type determination program which are capable of determining the type of a video image scene.

Another object of the present invention is to provide a video image processing system, a video image processing method, a video image processing program, which are capable of processing a video image by using a processing method corresponding to the type of the video image scene which is determined based on the type of the video image scene, and the server and the terminal of the video image processing system.

In a first aspect of the present invention, a video image type determination system includes a video image input section which inputs a video image photographed by a mobile video image photographing device; a moving feature variable obtaining section which obtains a moving feature variable indicating a feature of the video image photographing device in a state of moving; and a video image type determining section which determines a type of a video image scene included in the video image on the basis of the moving feature variable.

In a second aspect of the present invention, a video image processing system includes a video image input section, a moving feature variable obtaining section, a video image type determining section and a video image processing section. The video image input section inputs a video image photographed by a mobile video image photographing device. The moving feature variable obtaining section obtains a moving feature variable indicating a feature of the video image photographing device in a state of moving. The video image type determining section determines a type of a video image scene included in the video image on the basis of the moving feature variable. The video image processing section determines a processing method of the video image on the basis of the type of the video image scene determined by the video image type determining section, and processes the video image on the basis of the determined processing method.

The video image processing system may further include a display section which displays the video image which is processed by the video image processing section. It is therefore possible to reproduce and display the processed video image.

The moving feature variable obtaining section may include a speed input section which obtains a moving speed of the video image photographing device, a first position input section which obtains a photographing position of the video image photographing device, and a moving feature variable calculating section which calculates a moving feature variable corresponding to the video image scene on the basis of the photographing position and the moving speed.

The video image processing system may further include a route information memory section which stores route information, The route information is property information of the route capable of passing during the move. The moving feature variable calculating section calculates the moving feature variable corresponding to the video image scene on the basis of the route information, and the photographing position and the moving speed of the video image photographing device. The moving feature variable can be easily obtained by using the route information which was memorized in advance.

The route information may include at least any one of a route position, type, a number of lanes, a position of an intersection, a position of a junction, and existence of a signal.

The moving feature variable may include at least any one of a deviation variable between a current position of the video image photographing device and a predetermined route, a running speed, and a running straight variable.

The video image processing system may further include a landmark feature variable obtaining section which obtains a landmark feature variable indicating a feature of a landmark existing within a viewing angle of the video image. The video image type determining section determines the type of the video image scene on the basis of the landmark feature variable and the moving feature variable. In this case, not only the moving feature variable but also the landmark feature variable are employed, which enables to determine the type of the video image scenes further more.

The landmark feature variable obtaining section may include a direction input section which obtains the photographing direction of the video image photographing device, a second position input section which obtains the photographing position of the video image photographing device, a landmark information memory section which stores landmark information including property information of the landmark, and a landmark feature variable calculating section. The landmark feature variable calculating section calculates the landmark feature variable corresponding to the video image scene on the basis of the landmark information, the photographing position, and the photographing direction. In this case, the landmark feature variable can be easily obtained by using the photographing direction and the photographing position.

The landmark information may include a position and a form of the landmark. The landmark feature variable may include at least any one of a size of the landmark on a screen and a deviation variable from a screen center.

The video image type determining section may determine the type of the video image scene by determining whether or not the moving feature variable and the landmark feature variable are larger than threshold values. The type of the video image scene can be easily determined by performing a threshold value determination. The threshold values with respect to the moving feature variable and the landmark feature variable may be changed depending on a usage purpose.

The video image type determining section may calculate an importance level of the video image scene on the basis of at least one of values among the moving feature variable and the landmark feature variable, and determine the type of the video image scene when the calculated importance level is larger than a threshold value. It is therefore possible to perform an video image process exclusively for the important video image scene.

The video image processing section may exclusively process the video image of a specific video image scene. The display section may display a map including a position in which the video image is photographed while displaying the video image.

The display section may include a user interface for a user to set and input the usage purpose of the video image. The usage purpose of browsing the video image means, for example, a drive simulation or sightseeing drive guidance. Moreover, the user interface is realized by displaying a slide bar to set and input the usage purpose on the display section.

The type of the video image scene may include at least one of a turning corner scene, a landmark scene, a traffic congestion scene, a signal waiting scene, and other scene. In this case, the video image processing section may process the video image so as to perform a slow replay in the video image scene which is determined as the turning corner scene, processes the video image so as to display a ticker of the landmark information in the video image scene which is determined as the landmark scene, processes the video image so as to delete the video image scene which is determined as the traffic congestion scene, processes the video image so as to delete a video image scene which is determined as the signal waiting scene, and processes the video image so as to perform a high-speed replay in the video image scene which is determined as the other scene.

In a third aspect of the present invention, a server of a video image processing system which processes a video image photographed by a video image photographing device, is provided. The server includes a landmark information memory section, a landmark feature variable calculating section, a route information memory section to memorize the route information, a moving feature variable calculating section, a video image type determining section, a video image processing section, and a server-side transmission section. The landmark information memory section memorizes landmark information including property information of a landmark. The landmark feature variable calculating section calculates a landmark feature variable corresponding to a video image scene on the basis of the landmark information, and a photographing position and a photographing direction of the video image photographing device received from a terminal. The route information memory section memorizes route information. The moving feature variable calculating section calculates a moving feature variable corresponding to the video image scene on the basis of the route information, and the photographing position and the moving speed of the video image photographing device received from the terminal. The video image type determining section determines a type of the video image scene on the basis of the landmark feature variable and the moving feature variable. The video image processing section determines a processing method of the video image on the basis of the type of the video image scene, and processes the video image on the basis of the determined processing method. The server-side transmission section transmits the video image processed by the video image processing section to the terminal via a communication network.

In a forth aspect of the present invention, a server of a video image processing system which processes a video image photographed by a video image photographing device, is provided. The server includes a landmark information memory section, a landmark feature variable calculating section, a route information memory section to memorize route information, a moving feature variable calculating section, a video image type determining section, and a server-side transmission section. The landmark information memory section memorizes landmark information including property information of a landmark. The landmark feature variable calculating section calculates a landmark feature variable corresponding to a video image scene on the basis of the landmark information, and a photographing position and a photographing direction of the video image photographing device received from a terminal. The route information memory section memorizes route information. The moving feature variable calculating section calculates a moving feature variable corresponding to the video image scene on the basis of the route information, and the photographing position and the moving speed of the video image photographing device received from the terminal. The video image type determining section determines a type of the video image scene on the basis of the landmark feature variable and the moving feature variable. The server-side transmission section transmits the type of the video image scene to the terminal via a communication network. In this case, the amount of communication on the communication network can be substantially reduced in comparison with the case to transmit the video image to a server.

In a fifth aspect of the present invention, a terminal of a video image processing system which processes a video image photographed by a video image photographing device, is provided. The terminal includes a video image input section which inputs the video image; a direction input section which inputs a photographing direction of the video image photographing device; a position input section which inputs a photographing position of the video image photographing device; a speed input section which inputs a moving speed of the video image photographing device; a terminal-side transmission section which transmits the video image, the photographing direction, the photographing position and the moving speed to a server that processes the video image via a communication network; and a video image display section which displays the processed video image received from the server.

In a sixth aspect of the present invention, a terminal of a video image processing system which processes a video image photographed by a video image photographing device, is provided. The terminal includes a video image input section which inputs the video image; a direction input section which inputs a photographing direction of the video image photographing device; a position input section which inputs a photographing position of the video image photographing device; a speed input section which inputs a moving speed of the video image photographing device; a terminal-side transmission section which transmits the photographing direction, the photographing position and the moving speed to a server that determines a type of a video image scene via a communication network; a video image processing section which determines a method to process the video image on the basis of the type of the video image scene received from the server, and processes the video image on the basis of the determined processing method; and a video image display section which displays the video image processed by the video image processing section. In this case, the amount of communication on the communication network can be significantly reduced in comparison with the case to transmit the video image to the server.

In a seventh aspect of the present invention, a video image type determination method includes (A) inputting a video image photographed by a mobile video image photographing device; (B) obtaining a moving feature variable indicating a feature of the video image photographing device in a state of moving; and (C) determining a type of a video image scene included in the video image on the basis of the moving feature variable.

In a eight aspect of the present invention, a video image processing method includes (A) inputting a video image photographed by a mobile video image photographing device; (B) obtaining a moving feature variable indicating a feature of the video image photographing device in a state of moving; (C) determining a type of a video image scene included in the video image on the basis of the moving feature variable; and (D) determining a processing method of the video image on the basis of the type of the video image scene, and processing the video image on the basis of the determined processing method.

The video image processing method may further includes (B') obtaining a landmark feature variable indicating a feature of a landmark existing within a viewing angle of the video image. In this case, the type of the video image scene is determined on the basis of the landmark feature variable and the moving feature variable in the above (C) step.

In a ninth aspect of the present invention, a video image type determination program includes code that, when executed, causes a computer to perform (A) inputting a video image photographed by a mobile video image photographing device; (B) obtaining a moving feature variable indicating a feature of the video image photographing device in a state of moving; and (C) determining a type of a video image scene included in the video image on the basis of the moving feature variable.

In a tenth aspect of the present invention, a video image processing program includes code that, when executed, causes a computer to perform: (A) inputting a video image photographed by a mobile video image photographing device; (B) obtaining a moving feature variable indicating a feature of the video image photographing device in a state of moving; (C) determining a type of a video image scene included in the video image on the basis of the moving feature variable; and (D) determining a method to process the video image on the basis of the type of the video image scene, and processing the video image on the basis of the determined processing method.

The video image processing program may further include code that, when executed, causes the computer to perform (B') obtaining a landmark feature variable indicating a feature of a landmark existing within a viewing angle of the video image. In this case, the type of the video image scene is determined on the basis of the landmark feature variable and the moving feature variable in the above (C) step.

According to the present invention, it is possible to determine the type of the video image scene on the basis of the moving feature variable. The present invention also enables to process the video image by using the processing method corresponding to the determined type of the video image scene.

BRIEF DESCRIPTION OF THE DRAWINGS

FIG. 12 is an explanatory diagram showing an example of setting information in the video image processing treatment;

BEST MODE FOR CARRYING OUT THE INVENTION

First Embodiment

Figure 1:
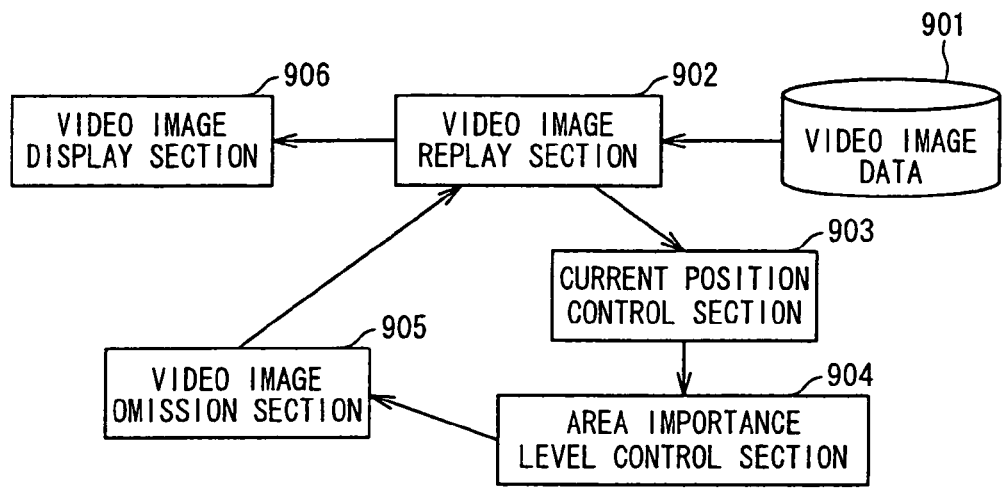
FIG. 1 is a block diagram showing an example of a configuration of a browsing system for a video image of a conventional mobile camera.
Figure 2:
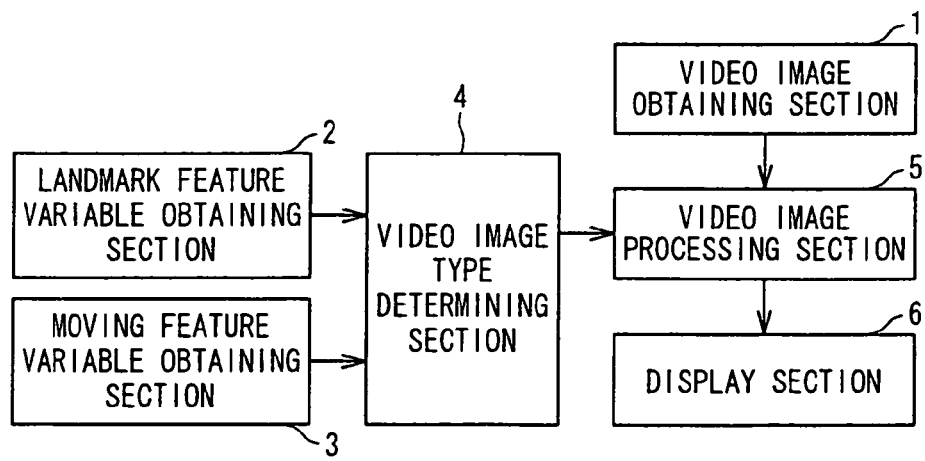
FIG. 2 is a block diagram showing an example of a configuration of a video image processing system according to a first embodiment of the present invention.

A first embodiment of the present invention will be explained below with reference to attached drawings. FIG. 2 is a block diagram showing an example of a configuration of a video image processing system according to the first embodiment of the present invention. As shown in FIG. 2, the video image processing system includes a video image obtaining section 1 to obtain the video image, a landmark feature variable obtaining section 2, a moving feature variable obtaining section 3, a video image type determining section 4, a video image processing section 5, and a display section 6.

Figure 3:
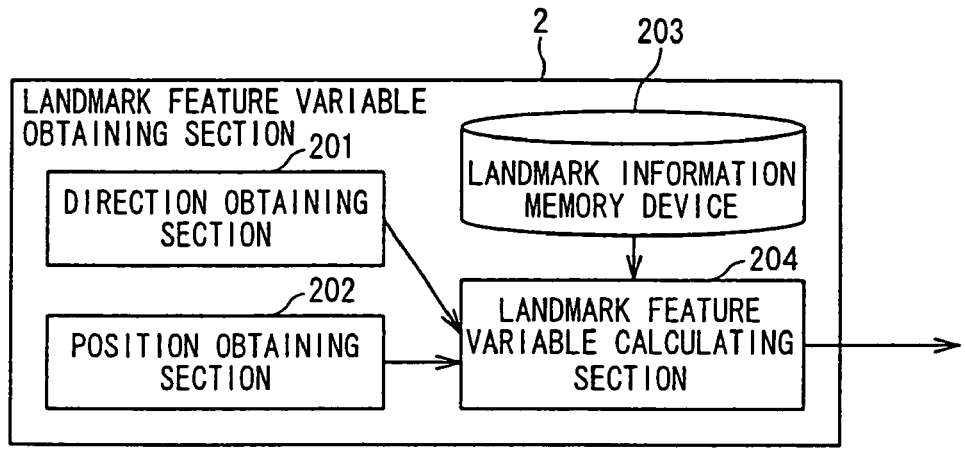
FIG. 3 is a block diagram showing an example of a configuration of a landmark feature variable obtaining section.

FIG. 3 is a block diagram showing an example of a configuration of the landmark feature variable obtaining section 2. As shown in FIG. 3, the landmark feature variable obtaining section 2 includes a direction obtaining section 201 to obtain the direction of the video image photographing device, a position obtaining section 202 to obtain the position of the video image photographing device, a landmark information memory device 203 to memorize landmark information, and a landmark feature variable calculating section 204 to calculate a landmark feature variable on the basis of the direction which is obtained by the direction obtaining section 201, the position which is obtained by the position obtaining section 202 and the landmark information.

The landmark information is property information of the landmark such as the position, height and form of the landmark. The landmark feature variable is also a feature variable to indicate a feature of the landmark in the video image.

Figure 4:
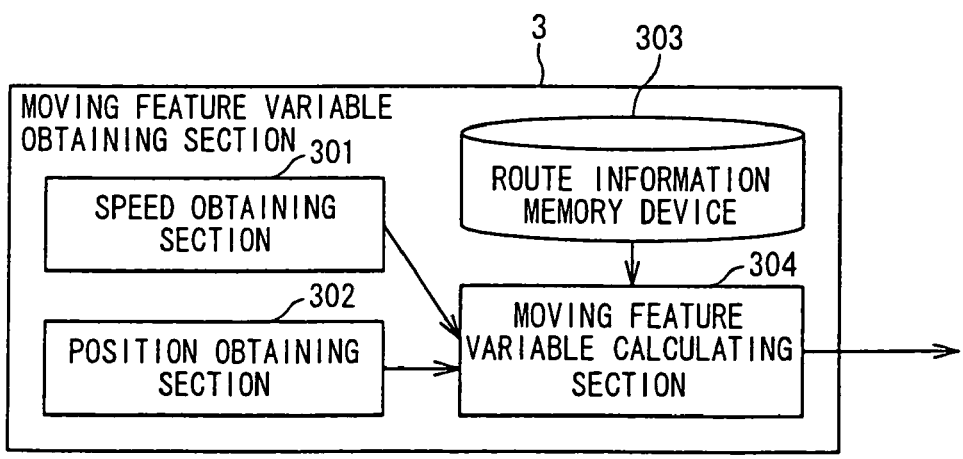
FIG. 4 is a block diagram showing an example of a configuration of a moving feature variable obtaining section.

FIG. 4 is a block diagram showing an example of a configuration of the moving feature variable obtaining section 3. As shown in FIG. 4, the moving feature variable obtaining section 3 includes a speed obtaining section 301 to obtain the speed of the video image photographing device, a position obtaining section 302 to obtain the position of the video image photographing device, a route information memory device 303 to memorize route information, and a moving feature variable calculating section 304 to calculate a moving feature variable on the basis of the direction which is obtained by the speed obtaining section 301, the position which is obtained by the position obtaining section 302, and the route information.

The route information is property information of a route which can be passed by the video image photographing device during the move, such as the route position, type, the number of the lanes, the position of the intersection/junction, and the existence of the signal. The moving feature variable is a feature variable to indicate a feature of the video image photographing device in the state of moving.

The video image obtaining section 1 is realized by, for example, a data processing unit (not shown), a program and an input interface (not shown) of the computer. The video image obtaining section 1 supplies the video image which is photographed by the mobile photographing device (video image photographing device). The mobile photographing device is a video image apparatus such as a CCD digital camera and a video camera. The mobile photographing device changes the photographing position and the photographing direction based on the position and direction of a mobile means such as a vehicle, person, ship and aircraft.

The landmark feature variable obtaining section 2 calculates the landmark feature variable on the basis of the direction and the position of the video image photographing device by which the video image is photographed, and information of the position and height of the landmark (landmark information) which is registered in the landmark information memory device 203 in advance.

The landmark feature variable obtaining section 2 obtains the position (a deviation variable from the screen center) and the size of the landmark on the screen as the landmark feature variable. The landmark is an object whose position and form can be described such as an artificial construction including a building, a bridge and a tower, and a natural structure including a mountain and a lake. If the moving position and time are already known, a moving object such as a train capable of being described by using a combined set of the time and position data may be employed as the landmark.

A representative point of the landmark is employed to describe the landmark. For example, latitude, longitude and a height of a center of gravity of the landmark is employed to describe the landmark. For example, a group of data indicating the latitude, the longitude and the height of the position of respective points such as polygon for configuring the landmark may also be employed.

The landmark information memory device 203 is realized by, for example, a magnetic disc device. The landmark information memory device 203 memorizes the position, the height and the form of the landmark in advance as the landmark information. The landmark information memory device 203 may also memorize incidental information such as history, usage fee and name recognition level of the landmark as the landmark information in addition to the position, the height and the form of the landmark.

The position obtaining section 202 is realized by, for example, a data processing unit, a program and an input interface of the computer. In this case, the position of the video image photographing device is described by using the latitude, the longitude and the height. The position obtaining section 202 supplies information of the latitude, the longitude and the height of the video image photographing device by using, for example, a GPS (Global Positioning System) device.

The direction obtaining section 201 is realized by, for example, the data processing unit and the input interface of the computer. The direction obtaining section 201 supplies the photographing direction (orientation) of the video image photographing device by using a magnetic compass, an electronic compass and a gyro sensor.

The landmark feature variable calculating section 204 is realized by, for example, the data processing unit and the program of the computer. The viewing angle informed in advance by the calculation of a focal distance of a camera and the size of a CCD element. The landmark feature variable calculating section 204 calculates the direction and distance of the respective points of the landmark in the case of being observed from the position of the video image photographing device by using the position of the landmark which is registered in advance in the landmark information memory device 203. The landmark feature variable calculating section 204 converts a relative position of the landmark into the position on the screen on the basis of the photographing position and the viewing angle in order to calculate the relative position as the landmark feature variable. The landmark feature variable calculating section 204 calculates the size of the landmark on the screen as the landmark feature variable.

The moving feature variable obtaining section 3 calculates a moving feature variable which indicates the feature of the video image photographing device in the state of moving. The moving feature variable obtaining section 3 calculates a running state, straightness (running straightness), a side trip level, and the running speed as the moving feature variable on the basis of the position and the moving speed of the video image photographing device, and route information which is registered in the route information memory device 303 in advance.

The route information memory device 303 is realized by, for example, the magnetic disc device. The route information memory device 303 memorizes in advance, as the route information, the route position, type (national road, private road and the like), the number of the lanes, the position of the intersection/junction, and the existence of the signal and the like.

The position obtaining section 302 is realized by, for example, the data processing unit, the program and the input interface of the computer. The position obtaining section 302 obtains, for example, information on the latitude, the longitude and the height of the video image photographing device by the input from the GPS. The position obtaining section 302 may also be equivalent to the position obtaining section 202 included in the landmark feature variable obtaining section 2.

The speed obtaining section 301 is realized by, for example, the data processing unit, the program and the input interface of the computer. The speed obtaining section 301 supplies the moving speed of the video image photographing device by using, for example, a speed mater and a car navigation device. Therefore, the speed obtaining section 301 obtains the moving speed of the video image photographing device.

The moving feature variable calculating section 304 is realized by, for example, the data processing unit and the program of the computer. In the case of obtaining "running state", the moving feature variable calculating section 304 determines whether it is in the state of stopping at the signal or the traffic congestion, the state of low-speed running and the state of normal running, by using the route information such as the moving speed of the video image photographing device, the route position, type (national road, private road and the like), the number of the lanes, the position of the intersection/junction, and the existence of the signal. When the route information is not available, the moving feature variable calculating section 304 performs a status determination by exclusively using the moving speed of the video image photographing device.

In the case of obtaining "straightness", the moving feature variable calculating section 304 calculates the straightness on the basis of the size of an angle made by a speed vector in the successive positions. The moving feature variable calculating section 304 is also capable of performing the status determination for a state of turning right or left at the intersection by a threshold determination using the straightness and the information on the intersection position included in the route information. When the mobile means is a car and the like, the moving feature variable calculating section 304 may obtain the straightness by using the rotation angle of a handle and a wheel as well as utilizing the successive positions.

In the case of establishing a moving route to the destination point by a navigation system or the like, the moving feature variable calculating section 304 also obtains, as the "side trip level", the distance deviation (hereinafter indicated as a route deviation variable) between the current position and the route (the established moving route) of the video image photographing device.

The video image type determining section 4 is realized by, for example, the data processing unit and the program of the computer. The video image type determining section 4 determines the type of the video image contents (the type of the video image scene) on the basis of the landmark feature variable and the moving feature variable in the respective video image scenes. The video image type determining section 4 determines the type of the video image scenes by performing the threshold determination respectively for the number of the landmark within the viewing angle, the position and size of the landmark on the screen in the landmark feature variable, and the running state, the straightness and the route deviation variable in the moving feature variable.

The landmark feature variable obtaining section 2 is not necessarily a prerequisite configuration factor in the present embodiment. If the video image processing system does not include the landmark feature variable obtaining section 2, the video image type determining section 4 determines the type of video image scenes exclusively on the basis of a moving feature variable which is obtained by the moving feature variable obtaining section 3.

The video image type determining section 4 may determine the type of the video image scene exclusively for an important video image scene instead of determining the type of all the video image scenes. In this case, the video image type determining section 4 determines the importance level of the video image scene on the basis of the "moving feature variable" and the "landmark feature variable". Then, the video image type determining section 4 determines the type of the video image scene exclusively for the video image scene which is determined as important on the basis of the obtained importance level.

The video image processing section 5 is realized by, for example, the data processing unit, the program and the memory device (not shown) of the computer. The video image processing section 5 determines a processing method with respect to the video image scene whose type is determined by the video image type determining section 4 in accordance with the usage purpose of the video image contents (sightseeing guidance, grasp of a drive route, observation and the like). Examples of the "observation" include observation in a hospital or a factory by using a camera mounted on a mobile-type robot. The video image processing section 5 processes the video image which is obtained by the video image obtaining section 1 in accordance with the determined processing method corresponding to the usage purpose of the video image contents, and outputs the processed video image.

The usage purpose may be specified and selected by the user, or may be automatically selected by the photographing position of the video image and the extracted landmark.

A processing method for usage purpose of the video image contents is set in advance. For example, the video image processing section 5 memorizes setting information of the processing method in advance. The video image processing section 5 may employ a general-purpose pattern of the processing method in setting the processing method, or may employ a pattern which is prepared or changed in accordance with the preference of the user.

Particularly in a scene which is extracted for the reason of the landmark existing, it is effective to display the name of the landmark in a ticker in order to notify the user the existence of the landmark. Therefore, the video image processing section 5 performs a process of displaying a ticker on the screen. Moreover, in a scene which is extracted for the reason of being a turning corner, the video image processing section 5 performs a process of a normal or slow replay along with a process of displaying the direction to turn since scenery shown on the screen significantly flows leftward and rightward.

The display section 6 is realized by, for example, the display device (not shown) of the computer. The display section 6 displays the video image contents which are processed by the video image processing section 5. The display section 6 may synchronize and display the photographing position and direction on the map along with the video image.

In the present embodiment, the video image input section corresponds to the video image obtaining section 1. The speed input section corresponds to the speed obtaining section 301. The first position input section corresponds to the position obtaining section 302. The route information memory section corresponds to the route information memory device 303. The direction input section corresponds to the direction obtaining section 201. The second position input section corresponds to the position obtaining section 202. The landmark information memory section corresponds to the landmark information memory device 203.

Moreover, in the present embodiment, the computer memory device to realize the video image processing system memorizes various kinds of programs in order to perform a process of the video image type determination and the video image processing. The computer memory device to realize the video image processing system, for example, stores the video image type determination program for performing a video image input process to input the video image photographed by the video image photographing device, the moving feature variable obtaining process to obtain the moving feature variable indicating the feature of the video image photographing device in the state of moving, and the video image type determination process to determine the type of the video image scene of the inputted video image.

Moreover, the computer memory device to realize the video image processing system stores, for example, a video image processing program for causing the computer to perform the video image input process to input the video image photographed by the video image photographing device, the moving feature variable obtaining process to obtain the moving feature variable indicating the feature of the video image photographing device in the state of moving, the video image type determination process to determine the type of the video image scene of the inputted video image on the basis of the moving feature variable, and the video image processing program to determine the processing method of the video image on the basis of the type of the determined video image scene and to process the video image in accordance with the determined processing method.

As described above, according to the present embodiment, the video image processing system is capable of determining the type of the video image scene on the basis of the moving feature variable and/or the landmark feature variable. It is also possible in the video image processing system to process the video image in accordance with the processing method corresponding to the type of the video image scene and the usage purpose.

Moreover, since the type of the video image scene can be determined according to the present embodiment, it is possible to determine a redundant video image scene or a video image scene whose viewing angle is significantly changed. In this case, it is possible to process a moving video image with high redundancy or a lot of changes by processing the high-speed replay or the slow replay for the respective video image scenes. According to the present embodiment, it is also possible to provide a processed video image corresponding to the usage purpose by changing the processing method to correspond to the respective video scenes following to the usage purpose.

Second Embodiment

Figure 5:
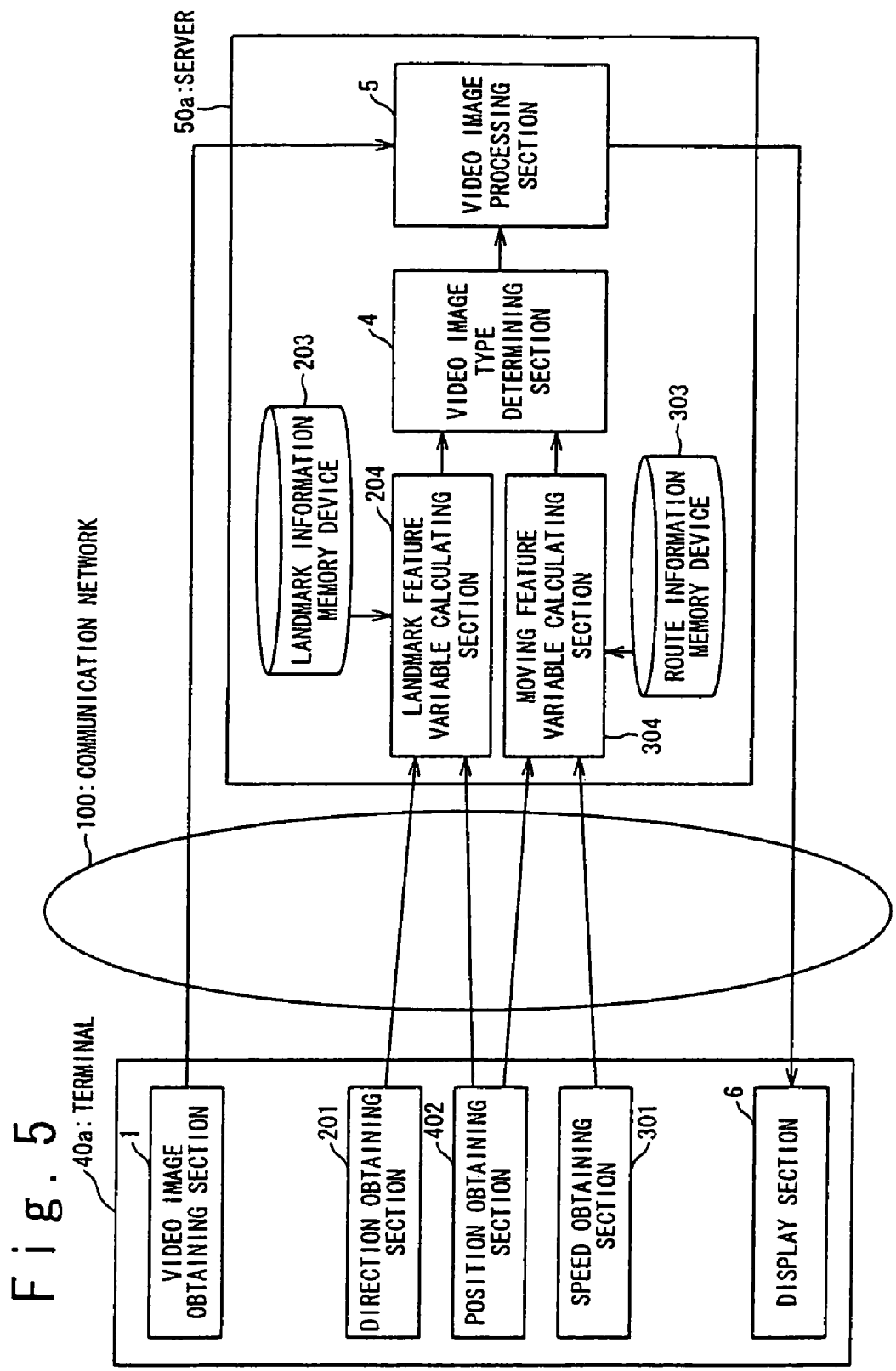
FIG. 5 is a block diagram showing an example of a configuration of a video image processing system according to a present embodiment of the present invention.

A second embodiment of the present invention will be explained below with reference to attached drawings. FIG. 5 is a block diagram showing an example of a configuration of the video image processing system according to the present embodiment. As shown in FIG. 5, the video image processing system in the present embodiment includes a terminal 40a and a server 50a. FIG. 5 also shows that the terminal 40a and the server 50a are connected via a communication network 100. The communication network 100 is a wireless communication network in the present embodiment.

The terminal 40a is a terminal carried by the person or mounted on the mobile means such as a vehicle, a ship and an aircraft. As shown in FIG. 5, the terminal 40a includes the video image obtaining section 1, the direction obtaining section 201, a position obtaining section 402, the speed obtaining section 301 and the display section 6.

The video image obtaining section 1, the direction obtaining section 201, the position obtaining section 402 and the speed obtaining section 301 are realized by a data processing unit (not shown), a program performed by the data processing unit, an input interface (not shown), and a network interface (not shown) of the terminal 40a. The display section 6 is also realized by the data processing unit, a display device (not shown) and the network interface of the terminal 40a.

A procedure for obtaining a video image in the video image obtaining section 1, a procedure for obtaining the direction of the video image photographing device in the direction obtaining section 201, a procedure for obtaining the moving speed of the video image photographing device in the speed obtaining section 301, and a procedure for displaying the video image contents in the display section 6 are equivalent to those of the first embodiment. A procedure for obtaining the position of the video image photographing device in the position obtaining section 402 is equivalent to the procedure for obtaining the position of the video image photographing device in the position obtaining section 202 and the position obtaining section 302 which are described in the first embodiment.

The server 50a includes the landmark information memory device 203, the landmark feature variable calculating section 204, the route information memory device 303, the moving feature variable calculating section 304, the video image type determining section 4, and the video image processing section 5 as shown in FIG. 5.

The landmark information memory device 203 and the route information memory device 303 are realized by, for example, the magnetic disc device. The landmark feature variable calculating section 204, the moving feature variable calculating section 304 and the video image processing section 5 are realized by a data processing unit (not shown), a program and a network interface (not shown) of the server 50a. The video image type determining section 4 is realized by the data processing unit and the program of the server 50a.

Contents of the landmark information memorized by the landmark information memory device 203 and the route information memorized by the route information memory device 303 are equivalent to those of the first embodiment. A procedure for calculating the landmark feature variable in the landmark feature variable calculating section 204, a procedure for calculating the moving feature variable in the moving feature variable calculating section 304, a procedure for determining the video image type in the video image type determining section 4, and a procedure for processing the video image in the video image processing section 5 are equivalent to those of the first embodiment.

In the present embodiment, the terminal 40a transmits the video image, the direction and the position of the video image photographing device, and the speed information to the server 50a (the video image processing section 5, the landmark feature variable calculating section 204 and the moving feature variable calculating section 304) via the communication network 100. The server 50a calculates the landmark feature variable on the basis of the received direction and position of the video image photographing device. The server 50a also calculates the moving feature variable on the basis of the received position of the video image photographing device and the speed information.

The server 50a (the video image type determining section 4) determines the type of the video image on the basis of the landmark feature variable and the moving feature variable. The server 50a (the video image processing section 5) processes the received video image in accordance with the type of the video image. The server 50a transmits a processed video image to the terminal 40a via the communication network 100. Accordingly, the terminal 40a (the display section 6) displays the received video image which is processed.

In the present embodiment, the landmark information memory section corresponds to the landmark information memory device 203 of the server 50a. The route information memory section corresponds to the route information memory device 303 of the server 50a. The server-side transmitting section corresponds to a control section and a network interface section of the server 50a.

In the present embodiment, the video image input section corresponds to the video image obtaining section 1 of the terminal 40a. The direction input section corresponds to the direction obtaining section 201 of the terminal 40a. The position input section corresponds to the position obtaining section 402 of the terminal 40a. The speed input section corresponds to the speed obtaining section 301 of the terminal 40a. The terminal-side transmitting section corresponds to the data processing unit and the network interface of the terminal

40*a*. The video image display section corresponds to the display section 6 of the terminal 40*a*.

According to the present embodiment, a terminal carried by the person or mounted on the mobile means such as the vehicle, the ship and the aircraft obtains the video image, the photographing direction, the photographing position and the moving speed, and then, transmits them to the server. Therefore, it is possible to display the video image which is processed by a processing method corresponding to the video image scene and the usage purpose in the same manner with the first embodiment.

Third Embodiment

Figure 6:
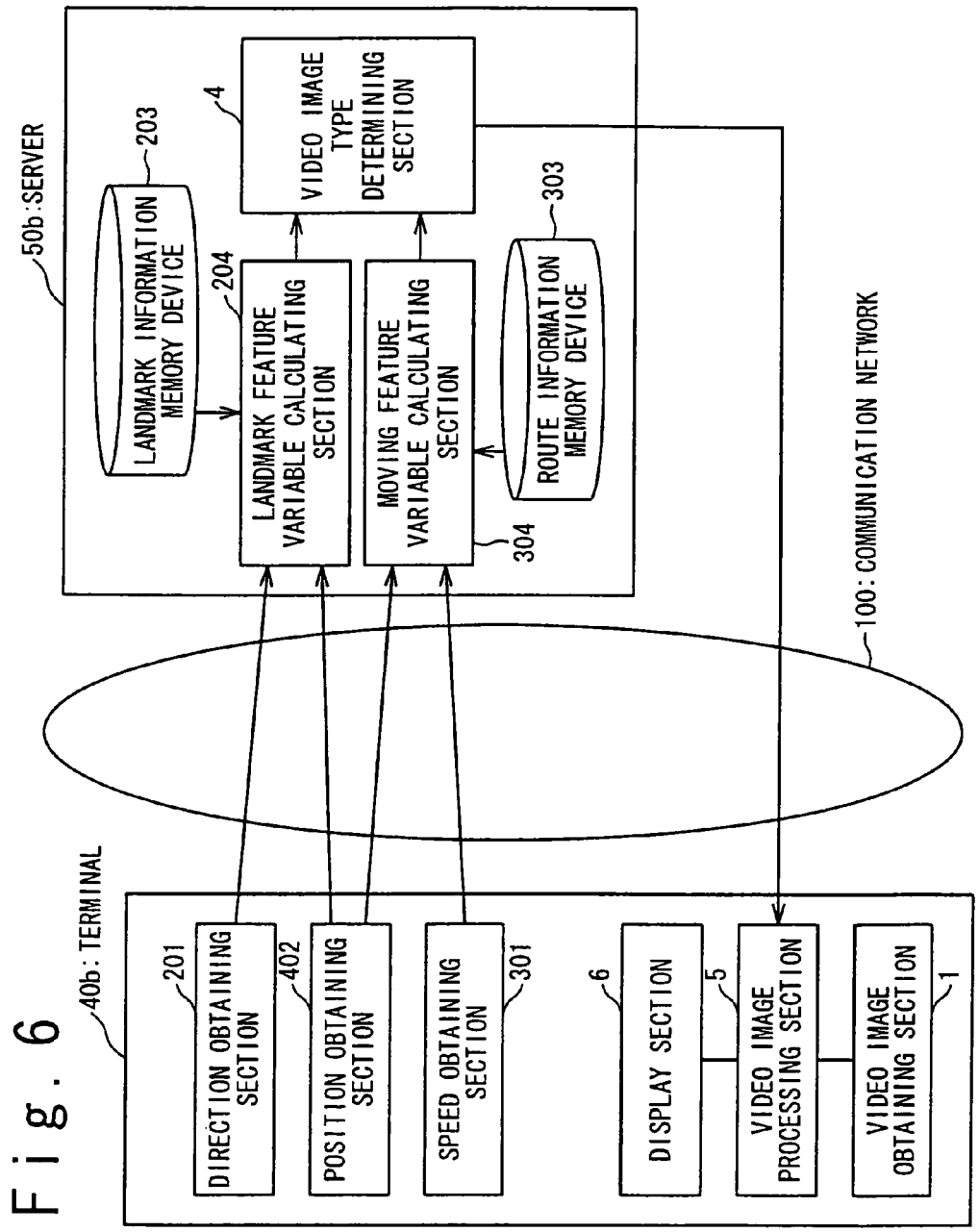
FIG. 6 is a block diagram showing an example of a configuration of a video image processing system according to a third embodiment of the present invention.

A third embodiment of the present invention will be explained below with reference to attached drawings. FIG. 6 is a block diagram showing an example of a configuration of the video image processing system according to the present embodiment. As shown in FIG. 6, the video image processing system in the present embodiment includes a terminal 40*b* and a server 50*b*. The terminal 40*b* and the server 50*b* are also connected via the communication network 100 as shown in FIG. 6. The communication network 100 in the present embodiment is a wireless communication network in the same manner with the second embodiment.

The terminal 40*b* is a terminal carried by the person or mounted on the mobile means such as the vehicle, the ship and the aircraft. As shown in FIG. 6, the terminal 40*b* includes the video image obtaining section 1, the direction obtaining section 201, the position obtaining section 402, the speed obtaining section 301, the video image processing section 5, and the display section 6.

The video image obtaining section 1 is realized by a data processing unit (not shown), a program and an input interface (not shown) of the terminal 40*b*. The direction obtaining section 201, the position obtaining section 402 and the speed obtaining section 301 are also realized by the data processing unit, the program, the input interface and a network interface (not shown) of the terminal 40*b*. The video image processing section 5 is realized by the data processing unit, the program and the network interface of the terminal 40*b*. The display section 6 is also realized by the data processing unit and a display device (not shown) of the terminal 40*b*.

A procedure for obtaining the video image in the video image obtaining section 1, a procedure for obtaining the direction of the video image photographing device in the direction obtaining section 201, a procedure for obtaining the moving speed of the video image photographing device in the speed obtaining section 301, a procedure for processing the video image in the video image processing section 5, and a procedure for displaying the video image contents in the display section 6 are equivalent to those of the first embodiment. A procedure for obtaining the position of the video image photographing device in the position obtaining section 402 are also equivalent to the procedure for obtaining the position of the video image photographing device in the position obtaining section 202 and the position obtaining section 302 which were described in the first embodiment.

The server 50*b* includes the landmark information memory device 203, the landmark feature variable calculating section 204, the route information memory device 303, the moving feature variable calculating section 304 and the video image type determining section 4 as shown in FIG. 6.

The landmark information memory device 203 and the route information memory device 303 are realized by, for example, the magnetic disc device. The landmark feature variable calculating section 204, the moving feature variable calculating section 304 and the video image type determining section 4 are realized by an data processing unit (not shown), a program and a network interface (not shown) of the server 50*b*.

Contents of the landmark information memorized by the landmark information memory device 203 and the route information memorized by the route information memory device 303 are equivalent to those of the first embodiment. A procedure for calculating the landmark feature variable in the landmark feature variable calculating section 204, a procedure for calculating the moving feature variable in the moving feature variable calculating section 304, and a procedure for determining the type of the video image in the video image type determining section 4 are also equivalent to those of the first embodiment.

In the present embodiment, the terminal 40*b* transmits exclusively the direction and the position of the video image photographing device and the speed information to the server 50*b* (the landmark feature variable calculating section 204 and the moving feature variable calculating section 304) via the communication network 100. The server 50*b* (the landmark feature variable calculating section 204) calculates a landmark feature variable on the basis of the received direction and position of the video image photographing device. The server 50*b* (the moving feature variable calculating section 304) also calculates a moving feature variable on the basis of the received position of the video image photographing device and the received speed information.

The server 50*b* (the video image type determining section 4) determines the type of the video image on the basis of the landmark feature variable and the moving feature variable. The server 50*b* then transmits a determination result of the type of the video image to the terminal 40*b* via the communication network 100.

The terminal 40*b* (the video image processing section 5) processes the video image which is obtained by the video image obtaining section 1 on the basis of the received determination result of the type of the video image. The terminal 40*b* (the display section 6) then displays the processed video image.

In the present embodiment, the landmark information memory section corresponds to the landmark information memory device 203 of the server 50*b*. The route information memory section corresponds to the route information memory device 303 of the server 50*b*. The server-side transmission section corresponds to the data processing unit and the network interface of the server 50*b*.

Furthermore, in the present embodiment, the video image input section corresponds to the video image obtaining section 1 of the terminal 40*b*. The direction input section corresponds to the direction obtaining section 201 of the terminal 40*b*. The position input section corresponds to the position obtaining section 402 of the terminal 40*b*. The speed input section corresponds to the speed obtaining section 301 of the terminal 40*b*. The terminal-side transmission section corresponds to the data processing unit and the network interface of the terminal 40*b*. The video image display section corresponds to the display section 6 of the terminal 40*b*.

According to the present embodiment, the terminal carried by the person or mounted on the mobile means such as the vehicle, the ship and the aircraft obtains the photographing direction, the photographing position and the moving speed in order to transmit to the server. Therefore, the determination result of the video image scene can be obtained. Meanwhile, compared to a case (the second embodiment) of transmitting the server the video image in addition to the photographing direction, the photographing position and the moving speed, the amount of communication on the communication network is significantly reduce.

FIRST OPERATIONAL EXAMPLE

Figure 7:
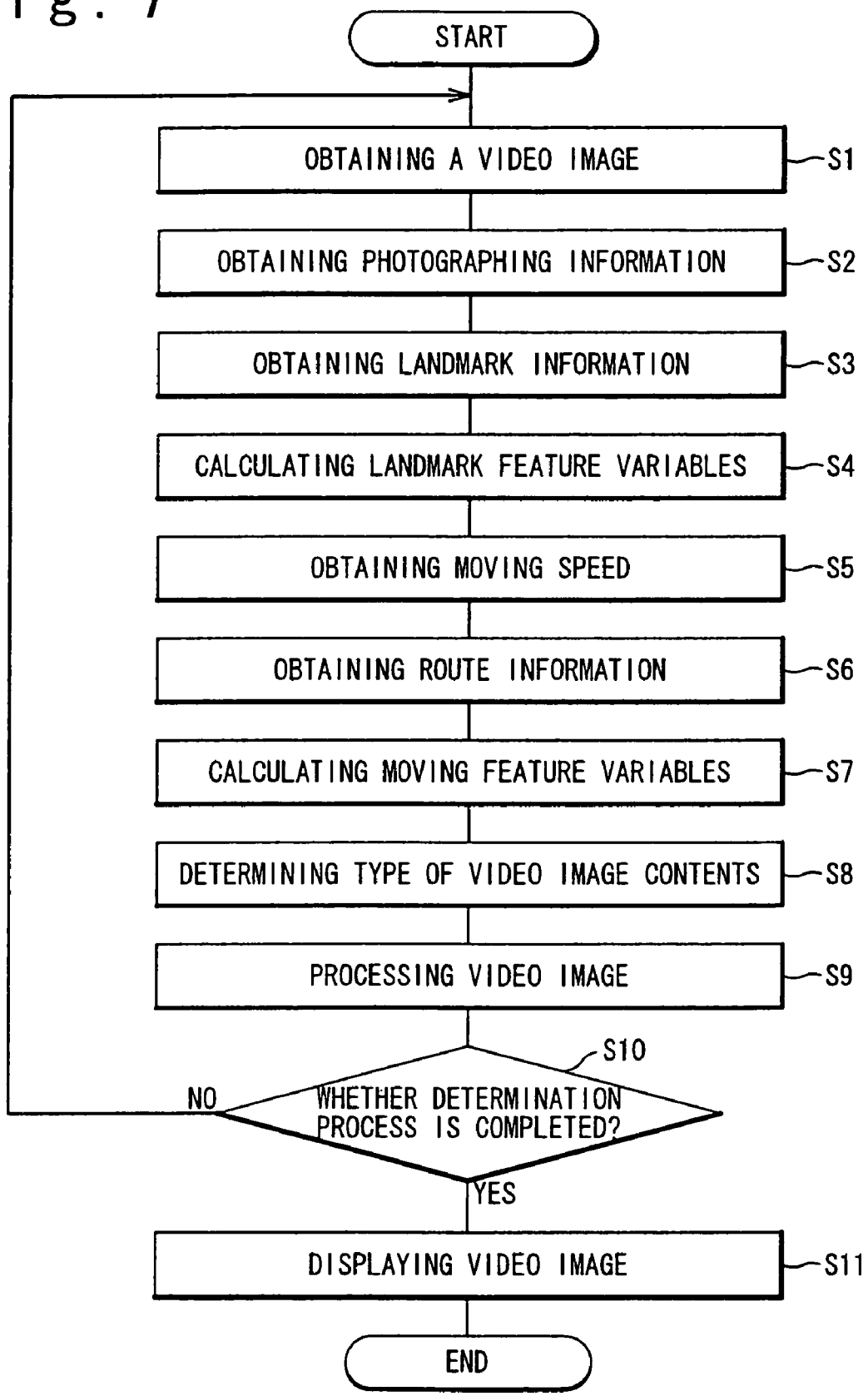
FIG. 7 is a flowchart showing an example of an operation of a video image processing system according to the present invention.

An operational example of the video image processing system described in the first embodiment will be explained with reference to attached drawings. FIG. 7 is a flowchart showing the example of the operation of the video image processing system. The operational example of the video image processing system will be explained by using this flowchart.

The video image obtaining section 1 obtains and records a video image from the video image photographing device such as the CCD camera (step S1). The direction obtaining section 201 obtains the photographing direction of the video image photographing device, and the position obtaining section 202 obtains the photographing position of the video image photographing device (step S2). The photographing direction obtained by the direction obtaining section 201 and the photographing position obtained by the position obtaining section 202 are referred as "photographing information" hereinafter.

This operational example shows a case that the position obtaining section 202 is equivalent to the position obtaining section 302. Accordingly, the photographing position obtained in step S2 is not only used for obtaining a landmark feature variable, but also used for obtaining the moving feature variable in the moving feature variable obtaining section 3.

The landmark feature variable obtaining section 2 records the photographing information which is made to have relevance to the video image obtained by the video image obtaining section 1. When JPEG is used as a method for recording one frame of the video image, for example, the photographing information may be recorded in the header. An obtaining time may also be recorded as a time stamp in the video image and the photographing information. Therefore, a one to one correspondence is made between the video image and the photographing information.

The video image photographing device such as the video camera records about 30 frames of the video image for one second in general. However, it is difficult for the GPS and the like to obtain the position information (latitude and longitude) more than once every second. Therefore, the current position information may be estimated by performing a correction of the immediate position information using the moving direction and speed. When the obtaining of the video image and the obtaining of the position information can be simultaneously performed in real time, it is not necessary to synchronize the time information.

The landmark feature variable calculating section 204 extracts and obtains the landmark information stored in the landmark information memory device 203 (step S3). Here, each landmark is regarded as $O_i$ (i=1 to N). The landmark is defined as a polygonal pillar having K number of apexes, wherein the position of the respective apexes is expressed as (x, y, z) by using the longitude, the latitude and the height. In this case, the k-th upper-side apex of the landmark $O_i$ is expressed as $(O_iLon_k, O_iLat_k, h_i)$.

The landmark feature variable calculating section 204 calculates the landmark feature variable on the basis of the photographing position, the photographing direction, the landmark position and the viewing angle which is obtained in advance (step S4). As the landmark feature variable, this operation example employs a landmark position on the screen (LF1), a landmark size on the screen (LF2), a ratio of the landmark shown on the screen (LF3), and a number of the landmark existing within the viewing angle (LFO). A procedure will be explained below to calculate the landmark feature variable in the landmark feature variable calculating section 204.

The landmark feature variable calculating section 204 converts the relative position of the each landmark $O_i$ (i=1 to N) observed from the photographing position into the camera viewing angle. Therefore, the landmark is determined whether or not to exist within the viewing angle, and the position and the size of the landmark on the screen are calculated. The conversion into the camera viewing angle means to calculate where the landmark is displayed on the screen.

As a preprocessing, the landmark feature variable calculating section 204 selects a landmark with a possibility of existing within the viewing angle among the landmarks corresponding to all the landmark information stored in the landmark information memory device 203. The landmark feature variable calculating section 204 then performs a conversion process into the camera viewing angle with respect to the selected landmark.

It is assumed that the latitude and longitude of the photographing position in the current frame is (CarLon, CarLat), the photographing direction is dir and the apex number of a polygon of the landmark $O_i$ is K=4. A procedure for determining whether or not the landmark exists within the viewing angle will be explained below by using figures. In this example, the photographing direction is expressed by an angle which is rotating clockwise with the north of 0 degree.

Figure 8:
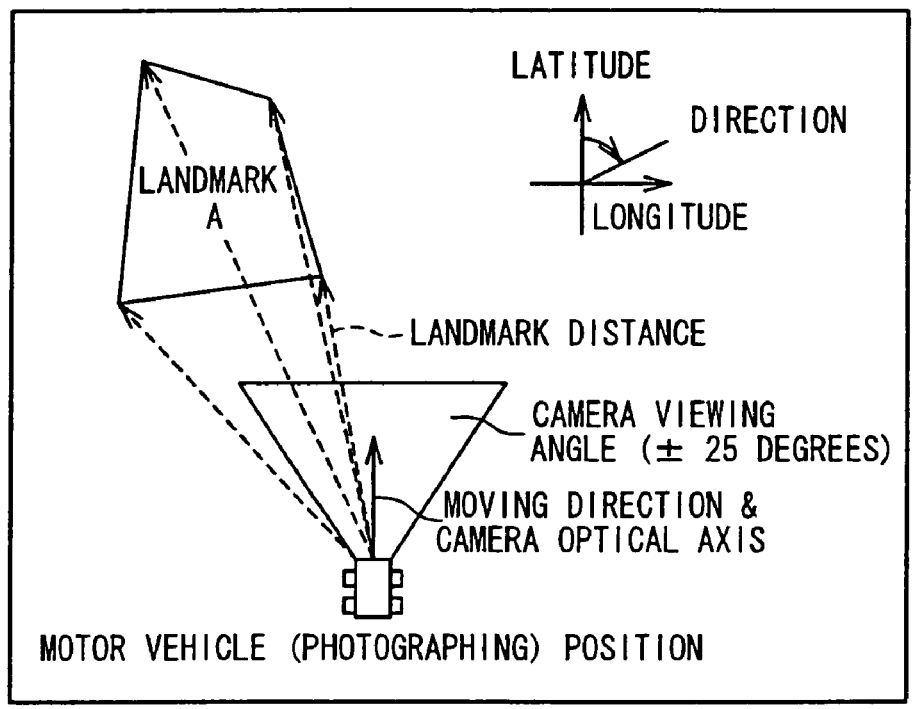
FIG. 8 is a diagram to explain data treatment of a video image processing according to the present invention.

FIG. 8 is a diagram to explain a process of determining whether or not the landmark exists within the horizontal viewing angle. The landmark feature variable calculating section 204 employs the following equation (1) to obtain an angle difference $diff_k$ between a moving direction (photographing direction) and a direction $ObjDir_k$ from the photographing position to the respective apexes of the landmark $O_i$ (landmark A in this example).

[Equation 1]

$$diff_k = ObjDir_k - dir (k=1\sim4) \quad (1)$$

The landmark feature variable calculating section 204 employs the following equation (2) to determine whether or not the angle difference $diff_k$ which is obtained by using the equation (1) is within the viewing angle. As shown in FIG. 8, for example, if a horizontal camera viewing angle CameraAngleH is 50 degrees, the angle difference $diff_k$ should be within ±25 degrees so that the angle difference $diff_k$ is within the viewing angle.

[Equation 2]

$$|diff_k| < \frac{1}{2} CameraAngleH \quad (2)$$

Figure 9:
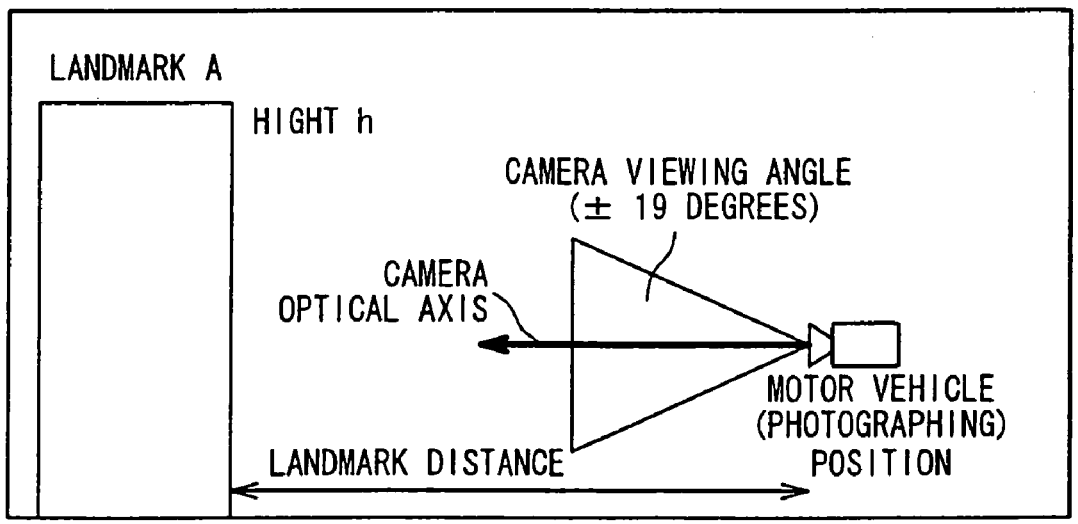
FIG. 9 is a diagram to explain data treatment of a video image processing according to the present invention.

FIG. 9 is a diagram to explain a process of determining whether or not the landmark exists within the vertical viewing angle. The landmark feature variable calculating section 204 employs the following equation (3) to calculate a look-up angle $lookup_i$ from the photographing position to the landmark apex on the basis of a distance $dist_i$ from a photographing position to the landmark and a height $h_i$ of the landmark.

[Equation 3]

$$lookup_i = \tan^{-1}\left(\frac{h_i}{dist_i}\right) \quad (3)$$

The landmark feature variable calculating section 204 employs the following equation (4) to determine whether or not the angle $lookup_i$ which is obtained by using the equation (3) is within the viewing angle. For example, a vertical camera viewing angle CameraAngleV is assumed to be 38 degree as shown in FIG. 9. When the angle $lookup_i$ satisfies the equation (4), the landmark feature variable calculating section 204 determines a possibility that the whole landmark is displayed.

[Equation 4]

$$lookup_i < \frac{1}{2} CameraAngleV \quad (4)$$

The direction $ObjDir_k$ from the photographing position to the each apex of the landmark $O_i$ and distance $dist_i$ from the photographing position to the landmark are employed in the above equations (1) to (4), here, the distance and the direction between the two points can be obtained by the following method.

We assume the coordinates of a measurement point 1 as $(x_1, y_1)$ and coordinates of a measurement point 2 as $(x_2, y_2)$ We also assume the average curvature radius as $R_0$ and the scaling factor in the origin of the coordinate system as $m_0$. In this case, the geodesic line length S between the two points is obtained by the following equation (5).

[Equation 5]

$$S = \frac{\sqrt{(x_2-x_1)^2 + (y_2-y_1)^2}}{\frac{s}{\overline{S}}} \quad (5)$$

$$\frac{s}{\overline{S}} = m_0\left\{1 + \frac{1}{6R_0^2 m_0^2}(y_1^2 + y_1 y_2 + y_2^2)\right\}$$

A directional angle $T_1$ of the measurement point 2 in the measurement point 1 and a directional angle $T_2$ of the measurement point 1 in the measurement point 2 are obtained by the following equation (6).

[Equation 6]

$$T_1 = t_1 - (t_1 - T_1) \quad (6)$$
$$T_2 = t_2 - (t_2 - T_2)$$
$$t_1 = \tan^{-1}\frac{y_2 - y_1}{x_2 - x_1}$$
$$t_2 = t_1 + 180°$$
$$(t_1 - T_1) = -\frac{1}{4m_0^2 R_0^2}(y_2 + y_1)(x_2 - x_1) + \frac{1}{12m_0^2 R_0^2}(x_2 - x_1)(y_2 - y_1)$$
$$(t_2 - T_2) = -\frac{1}{4m_0^2 R_0^2}(y_2 + y_1)(x_2 - x_1) + \frac{1}{12m_0^2 R_0^2}(x_2 - x_1)(y_2 - y_1)$$

Calculation formulae which were indicated in the equation (5) and the equation (6) are described in the homepage of the Geographical Survey Institute in Japan (http://vldb.gsi.go.jp/sokuchi/surveycalc/algorithm/xy 2st/xy2st.htm).

The landmark feature variable calculating section 204 is capable of determining whether or not the landmark $O_i$ exists within the viewing angle by determining whether or not an apex k satisfying the equation (2) exists in accordance with the above procedures. The landmark feature variable calculating section 204 can also determine whether the landmark $O_i$ exists on the right side or the left side of the video image by a sign (+ or −) of the angle difference $diff_k$ with respect to the apex k. Moreover, the landmark feature variable calculating section 204 can determine whether the whole landmark exists within the viewing angle or a part of the landmark exceeds the viewing angle by depending on whether or not all the apexes k satisfy the equation (2) and the equation (4).

The landmark feature variable calculating section 204 calculates the position and size of the landmark on the screen exclusively for the landmark $O_i$ which satisfies the equation (2) and the equation (4). The landmark feature variable calculating section 204 calculates the position $(x_k, y_k)$ on the screen for the respective apexes k (=1 to 4) of the landmark $O_i$ existing within the viewing angle. The landmark feature variable calculating section 204 then extracts circumscribed rectangles $(x_{min}, y_{min})$ to $(x_{max}, y_{max})$ including these apexes by using the following equation (7). In the equation (7), "Min" is a function to extract the minimum value, and "Max" is a function to extract the maximum value.

[Equation 7]

$$x_{min} = \text{Min}(x_1, x_2, x_3, x_4)$$
$$y_{min} = \text{Min}(y_1, y_2, y_3, y_4)$$
$$x_{max} = \text{Max}(x_1, x_2, x_3, x_4)$$
$$y_{max} = \text{Max}(y_1, y_2, y_3, y_4) \quad (7)$$

Figure 10:
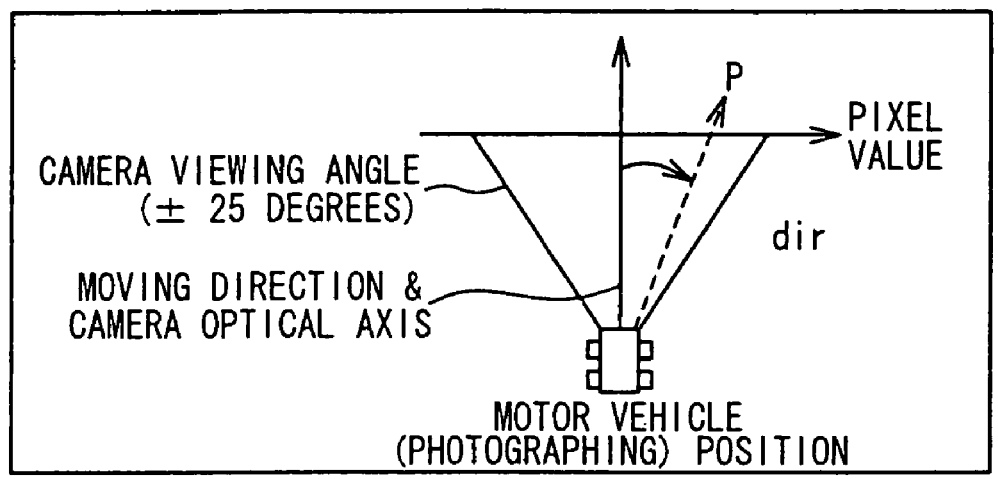
FIG. 10 is a diagram to explain data treatment of a video image processing according to the present invention.

The landmark feature variable calculating section 204 also obtains the position (x, y) of a point P on the screen which corresponds to the angle difference diff and the angle lookup. FIG. 10 is a diagram to explain a process of obtaining the position (x, y) of the point P on the screen. It is assumed that the screen has, for example, 640×480 pixels. The landmark feature variable calculating section 204 obtains the position (x, y) of the point P on the screen by using the following equation (8).

[Equation 8]

$$x = 320 + 320\frac{2diff}{CameraAngleH} \text{ [pixel]} \quad (8)$$
$$y = 240 + 240\frac{2lookup}{CameraAngleV} \text{ [pixel]}$$

Next, the landmark feature variable calculating section 204 calculates the ratio and size of the landmark which is displayed within the viewing angle. The landmark feature variable calculating section 204 obtains the size Size of the whole landmark including the area outside the viewing angle by using the following equation (9). The landmark feature variable calculating section 204 also obtains the size Size' of the portion of the landmark which is displayed within the viewing angle by using the equation (10).

[Equation 9]

$$\text{Size} = (x_{max} - x_{min})(y_{max} - y_{min}) \quad (9)$$

[Equation 10]

$$\text{Size}' = (x_{max}' - x_{min}')(y_{max}' - y_{min}') \quad (9)$$

if $(x_{max} > 640)$ then $x_{max}' = 640$ if $(y_{max} > 480)$ then $y_{max}' = 480$ if $(x_{min} < 0)$ then $x_{min}' = 0$ if $(y_{min} < 0)$ then $y_{min}' = 0 \quad (10)$ The landmark feature variable calculating section 204 also calculates the ratio Pt of the landmark which is displayed within the viewing angle by using the following equation (11).

[Equation 11]

$$Pt = \frac{\text{Size}'}{\text{Size}} \quad (11)$$

The landmark feature variable calculating section 204 calculates the landmark feature variables (LF1, LF2, LF3) for the respective landmarks. In this case, the landmark feature variable calculating section 204 may use $(x_{min}, y_{min}, x_{max}, y_{max})$ as the feature variable $LF1_i$ of the position of the landmark $O_i$. For simplification, the landmark feature variable calculating section 204 may use $LF1_i = ((x_{min} + x_{max})/2, (y_{min} + y_{max})/2)$ by using the center point of the landmark $O_i$.

The landmark feature variable calculating section 204 determines the landmark feature variables LF2 and LF3 of the landmark $O_i$ as $LF2_i = \text{Size}$ and $LF3_i = Pt$, respectively.

The landmark feature variable calculating section 204 also obtains the number of the landmarks which are determined as existing within the viewing angle. The landmark feature variable calculating section 204 obtains the number of the landmarks satisfying the equation (2) and the equation (4) as the landmark feature variable LF0.

The landmark feature variable calculating section 204 may obtain, as the other landmark feature variables, a genre of the landmark (LF4), a name recognition level of the landmark (LF5) and the accumulated time of displaying the identical landmark.

The moving feature variable calculating section 304 obtains the moving speed by the input from the speed obtaining section 301 (step S5). The speed obtaining section 301 obtains the moving speed of the video image photographing device from a speed mater or the car navigation device in the case of the car for example. The moving feature variable calculating section 304 may obtain the moving speed by performing a time-differentiation of the positions of the video image photographing device which are successively obtained by the position obtaining section 302.

The moving feature variable calculating section 304 obtains route information stored in the route information memory device 303 (step S6). The moving feature variable calculating section 304 extracts, as the route information, the dot series of the longitude/latitude, the road type (public road or private road), the road width, the number of the lanes, the existence of the intersection, the existence of the signal and the limited speed. In this case, the moving feature variable calculating section 304 extracts the route information corresponding the vicinity of the moving route of the video image photographing device among the route information stored in the route information memory device 303 on the basis of the photographing position obtained in the above step S2.

The moving feature variable calculating section 304 calculates the moving feature variable on the basis of the position of the video image photographing device, the moving speed and the route information (step S7). In this case, the moving feature variable calculating section 304 employs the photographing position (moving position) of the video image photographing device which is obtained in step S2. In this operational example, the running state (DF1), the straightness (DF2) and the side trip feature variable (DF3) are employed as the moving feature variable.

The moving feature variable calculating section 304 obtains the running state feature variable DF1 by using the route information, a moving speed Sp [km/hour] and a limited speed LS [km/hour] with the following procedures. It is assumed in the moving feature variable calculating section 304 that the running state is "stop" if the moving speed SP is 0, the running state is "low speed" if the Sp is (LS–10) or lower, and the running state is "normal" if the Sp is (LS–10) or more. The stop state is expressed as WDF1=0, the low-speed running state is expressed as WDF1=1, and the normal running state is expressed as WDF=2.

When the condition of "intersection=nonexistent or existent", "signal=existent" and "WDF=0" is satisfied, for example, the moving feature variable calculating section 304 determines the feature variable DF1 as "DF1=0". Meanwhile, when the condition of "intersection=nonexistent or existent", "signal=nonexistent" and "WDF1=0" is satisfied, the moving feature variable calculating section 304 determines the feature variable DF1 as "DF1=1". In the other cases, the moving feature variable calculating section 304 determines the feature variable DF1 as "DF1=2".

Figure 11:
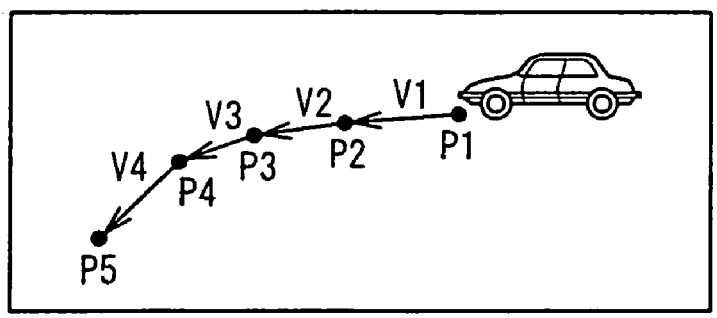
FIG. 11 is an explanatory diagram showing an example of a method for calculating straightness.

The moving feature variable calculating section 304 also calculates the straightness DF2. The moving feature variable calculating section 304 calculates the straightness by using the photographing position of the current frame and the photographing position in a frame before having predetermined regular intervals. FIG. 11 is a diagram to explain a calculation method of the straightness. FIG. 11 shows a locus of the photographing positions (P1 to P5) for up to the past 5 seconds including a notice frame (current frame).

The moving feature variable calculating section 304 calculates the speed vectors V1 to V4 by a car position (photographing positions) of five points P1 to P5 which are obtained every one second. The size of an angle made by the obtained speed vectors is defined as a rectilinear factor direct. At this time, the moving feature variable calculating section 304 calculates the rectilinear factor direct by using the following equation (12).

[Equation 12]

$$\text{direct} = \frac{|V1 \cdot V2|}{|V1||V2|} \frac{|V2 \cdot V3|}{|V2||V3|} \frac{|V3 \cdot V4|}{|V3||V4|} \quad (12)$$

When the intersections are apart and the rectilinear factor is small, the moving feature variable calculating section 304 determines that the car is in the state of driving a curb and sets the feature variable DF2 at an intermediate value. Moreover, when the rectilinear factor is small and the intersections are close, the moving feature variable calculating section 304 determines that the car is turning right or left and sets the feature variable DF2 at a large value. In the other cases, the moving feature variable calculating section 304 sets the feature variable DF2 at a small value.

For example, we assume that a predetermined threshold value thresdir is set in advance. The moving feature variable calculating section 304 sets the feature variable DF2 as DF2=2 when the condition of "direct<thresdir" and "intersection=nonexistent" is satisfied. The moving feature variable calculating section 304 also sets the feature variable DF2 as DF2=3 when the condition of "direct<thresdir" and "intersection=existent" is satisfied. In the other cases, the moving feature variable calculating section 304 establishes the feature variable DF2 as DF2=1.

The moving feature variable calculating section 304 calculates the side trip feature variable DF3 on the basis of a route deviation variable Rd between the current position of the video image photographing device and the guidance route of the car navigation, and the existence of the intersection. The moving feature variable calculating section 304 may obtain the route deviation variable Rd itself as a moving feature variable.

For example, we assume that a predetermined threshold value thresRd is set in advance. The moving feature variable calculating section 304 determines the feature variable DF3 as DF3=1 when the condition of "Rd<thresRd" and "intersection=nonexistent or existent" is satisfied. The moving feature variable calculating section 304 also determines the feature variable DF3 as DF3=2 when the condition of "Rd>thresRd" and "intersection=existent" is satisfied. The moving feature variable calculating section 304 further determines the feature variable DF3 as DF3=3 when the condition of "Rd>thresRd" and "intersection=nonexistent" is satisfied. The moving feature variable calculating section 304 calculates the route deviation variable Rd by using the following equation (13).

[Equation 13]

$$Rd = \text{Min}(\text{dist}(x, y, Rd_x, Rd_y)) \quad (13)$$

In the equation (13), x, y are the longitude and latitude to indicate the photographing position, and $Rd_x$, $Rd_y$ are the longitude and latitude of one point for configuring the guidance route in the navigation system. Furthermore, Min is a function to extract the minimum value in the equation (13).

The moving feature variable calculating section 304 outputs the moving feature variables=(DF1, DF2, DF3) which were obtained in accordance with the above procedures.

The moving feature variable calculating section 304 may employ a variable indicating the change of the road size as a moving feature variable DF4 in addition to the above DF1, DF2 and DF3. For example, we consider the case that "value 2" is allocated to the public road and "value 1" is allocated to the private road. When the car moved into the private road from the public road, the moving feature variable calculating section 304 calculates DF4=−1 as the moving feature variable DF4. Also, when the car moved into the private road from the private road, the moving feature variable calculating section 304 calculates DF4=0 as the moving feature variable DF4. Moreover, when the car moved into the public road from the private road, the moving feature variable calculating section 304 calculates DF4=1 as the moving feature variable DF4.

Next, the video image type determining section 4 determines the type of the video image contents on the basis of the landmark feature variable and the moving feature variable (step S8). In this operational example, the video image type determining section 4 determines the type of the video image contents by classifying the video image scenes into categories. In order to classify the video image scenes into the categories, the video image type determining section 4 performs a process explained below for the respective video image scenes. In this example, it is shown a case in which the running state (DF1) and the straightness (DF2) are employed as the moving feature variable, and the number of the landmarks (LF0) existing within the viewing angle is employed as the landmark feature variable.

In this operational example, the video image type determining section 4 determines "corner/junction point category" in the case of DF2=3, "traffic congestion category" in the case of DF1=1, "signal waiting category" in the case of DF1=0 as the video image category. The video image type determining section 4 also determines "landmark category" as the video image category in the case other than LF0=0. Furthermore, in the case of meeting none of these conditions, the video image type determining section 4 determines "other category" as the video image category. The video image type determining section 4 outputs the determined category. The video image type determining section 4 may classify one video image scene into one category, and one video image scene into a plurality of categories.

In this operational example, the case to determine the type of the video image scene is explained by using the moving feature variables DF1 and DF2 along with the landmark feature variable LF0. However, the method for determining the type of the video image scene is not limited to this case. For example, the video image type determining section 4 may determine the type of the video image scene as the landmark feature variable by using LF0 to LF3. In this case, the video image type determining section 4 classifies "whole landmark scene" in the case of displaying the whole landmark within the screen, "front landmark scene" in the case of displaying the landmark in the screen center, "enlarged landmark scene" in the case of displaying the landmark on a large scale within the screen, and the like.

For example, the video image type determining section 4 may select "whole landmark scene" if "LF0≠0 and LF3>0.9". If "LF0≠0 and |LF1 coordinates (x, y)−screen center coordinates |<predetermined threshold value", the video image type determining section 4 may select "front landmark scene". If "LF0≠0 and LF2>predetermined threshold value", "enlarged landmark scene" may be selected. The video image type determining section 4 may also classify the respective video image scenes into, for example, "mountain scene", "building scene" and "famous landmark scene" by further employing the landmark feature variables LF4 and LF5.

The threshold value for the respective moving feature variables and the respective landmark feature variables may be changed depending on the usage purpose. The video image type determining section 4 may determine the type of the video image scene by changing the threshold value for the usage purpose.

The video image processing section 5 extracts a video image processing method applied to the video image scene on the basis of the type (category) of the video image scene determined in step S8 and the usage purpose specified by the user in accordance with a predetermined rule. FIG. 12 shows an example of setting information (rule) with regard to the video image processing method. In this operational example, the video image processing section 5 includes the memory device, wherein the setting information indicated in FIG. 12 is memorized in the memory device in advance. The video image processing section 5 extracts the video image processing method in accordance with the setting information indicated in FIG. 12. The setting information indicated in FIG. 12 can be renewed by the input of the user.

The video image processing section 5 sets a video image processing method as follows in accordance with the rule indicated in FIG. 12. For example, when the type of the video image is the landmark scene (landmark category) and the usage purpose is the grasp of the route, the video image processing section 5 selects "with ticker" as the processing method. Moreover, when the type of the video image is a cornering scene (turning corner/junction category) and the usage purpose is the grasp of the route, the video image processing section 5 selects "slow replay" and "guidance instruction display" as the processing method. Furthermore, when the type of the video image is a stop scene (traffic congestion category or signal waiting category) and the usage purpose is the grasp of the route, the video image processing section 5 selects "skip (scene cut)" as the processing method.

Meanwhile, when the type of the video image is the other unimportant scene (other category) and the usage purpose is the grasp of the route, the video image processing section 5 selects "fast-forwarding replay (high-speed replay)" as the processing method. When the type of the video image is the other unimportant scene and the usage purpose is sightseeing, the video image processing section 5 selects "scene cut" as the processing method.

The video image processing section 5 processes the video image in accordance with the selected processing method (step S9). In the case of performing the slow replay processing, the video image processing section 5 inserts an interpolated frame between video image frames in accordance with the slow replay magnification. For example, when the slow replay magnification is double, the video image processing section 5 inserts the interpolated frame between the successive first frame and the second frame. In this case, the video image processing section 5 is capable of making the interpolated frame by obtaining the average of pixel values of both frames.

In the case of processing with ticker, the video image processing section 5 superimposes the name of the landmark which possibly exists within the viewing angle. The video image processing section 5 performs a processing so as to display the ticker in the middle above the landmark existing area without covering the displayed landmark. When the ticker shows the route instruction information, the video image processing section 5 also performs a processing to display the ticker on the screen center. When the landmark existing area is overlapped in the display space, the video image processing section 5 performs a processing to display the ticker in the middle between the lower side of the landmark existing area and bottom end of the screen. The ticker can be thereby superimposed on the road area without covering the landmark.

In the case of performing the scene cut processing, the video image processing section 5 performs the processing by skipping the frame. In the case of performing the high-speed replay processing, the video image processing section 5 thins a frame out among the front and behind frames based on high-speed magnification. In the case of the double speed, for example, the video image processing section 5 performs a double-speed replay by skipping the second frame in the successive two frames.

When the ticker of the landmark name, the landmark incidental information and the route instruction information are superimposed on the video image, the amount of the information on the screen is increased. Therefore, there is the case that the user has a difficulty of grasping the information when the high-speed replay or the normal-speed replay is performed. Hence, the replay speed may be set as slow by depending on the amount of the information superimposed on the video image. For example, the video image processing section 5 may set the replay speed on the basis of the following equation (14).

"Replay Speed"="Initial Setting Replay Speed"/(1+
"Weighting Parameter"×"Number of Characters"×"Distance between Words") (14)

The video image processing section 5 determines whether or not the determination process is completed with respect to all the video image frames (step S10). When there is a frame whose determination process is not completed, the video image processing system repeats to perform the processing of step S1 and the following steps with respect to the unprocessed frame. When the determination process is performed for all the frames, the video image processing section 5 outputs a group of the frames which is generated by the processing treatment. The video image processing section 5 may process and output exclusively a certain-type video image scene in accordance with the determined processing method.

Figure 13:
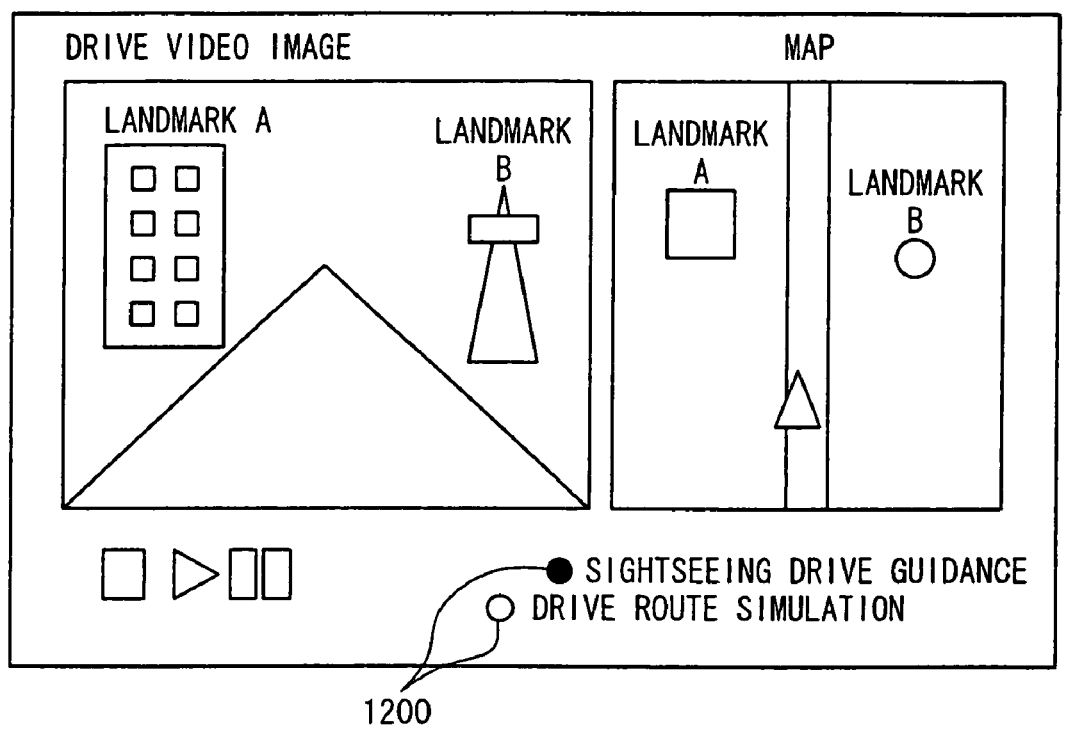
FIG. 13 is a conceptual diagram showing an example of a display screen.

The display section 6 replays the outputted group of the frames for displaying the video image (step S11). FIG. 13 shows an example of displaying the video image in the display section 6. As shown in FIG. 13, the display section 6 displays the video image to be replayed by synchronizing with a map in the vicinity of the photographing position. Meanwhile, the display screen includes a usage selection button 1200 and the like as the user interface in which the usage purpose of the user (e.g., drive route simulation and sightseeing drive guidance) can be specified to input.

SECOND OPERATIONAL EXAMPLE

Figure 14:
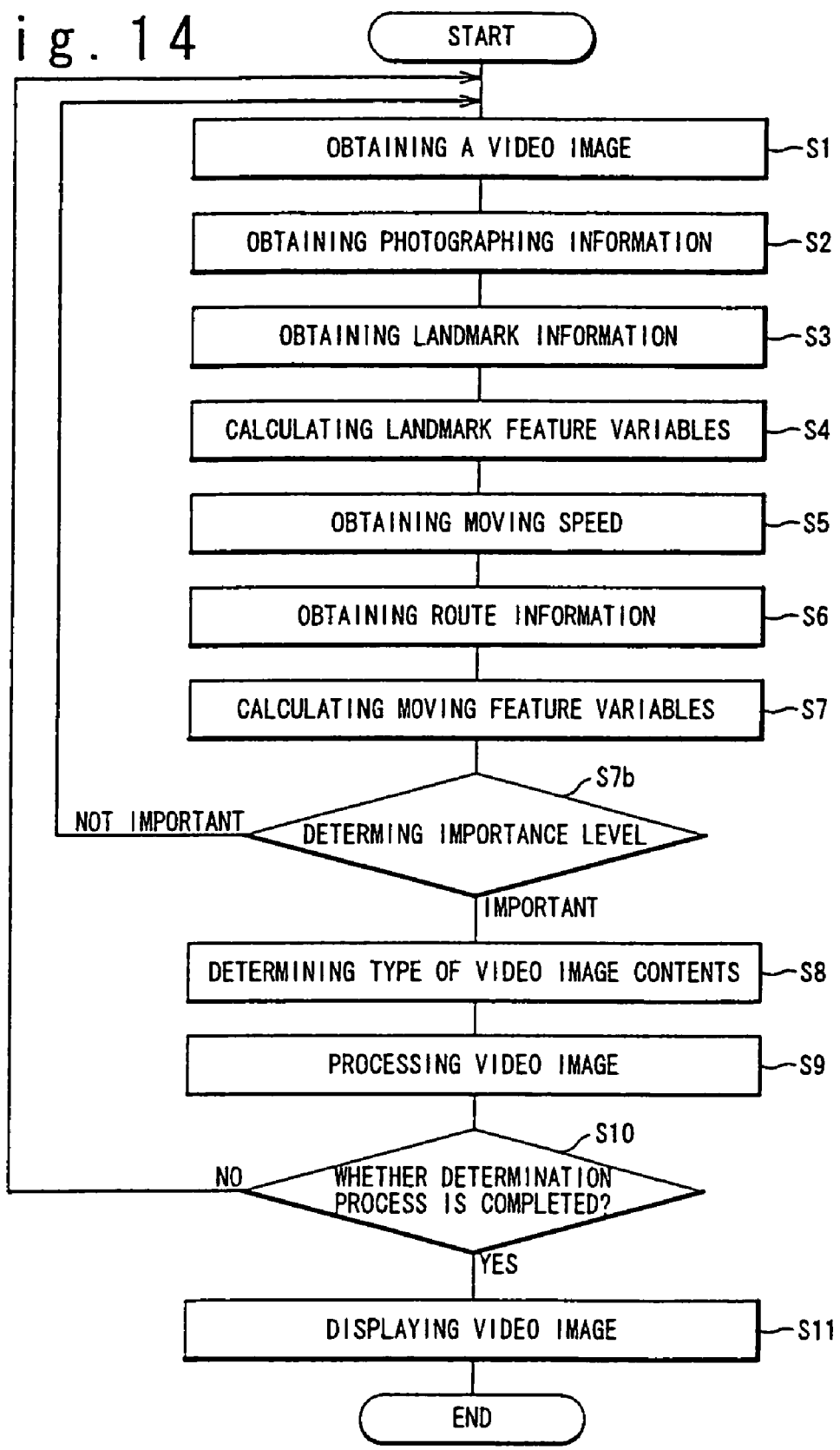
FIG. 14 is a flowchart showing an operation of the video image processing system according to the present invention.

A second operational example of the video image processing system indicated in the first embodiment will be explained with reference to attached drawings. FIG. 14 is a flowchart showing an operational example of the video image processing system. An operational example of the video image processing system will be explained by using this flowchart.

As shown in FIG. 14, an importance level determination process is performed in this operational example in addition to the respective processes described in the first operational example. The newly added importance level determination process (step S7b) will be explained below. The processes other than the importance level determination process are equivalent to those described in the first operational example.

The video image type determining section 4 calculates a landmark scene importance level $f_l$ by using the landmark feature variables (LF1, LF2 and LF3). The landmark scene importance level $f_l$ indicates the importance level with regard to the landmark in the video image scene which is the object for processing. The video image type determining section 4 also calculates a drive information scene importance level $f_d$ by using the moving feature variables (DF1, DF2 and DF3). The drive information scene importance level $f_d$ indicates the importance level with respect to the driving in the video image scene which is the object for processing.

The video image type determining section 4 obtains the landmark importance $f_l$ by the sum of the product between the feature variable in the respective landmarks and a weighting parameter as expressed in the following equation (15). The video image type determining section 4 also obtains the drive information scene importance level $f_d$ by the product of the respective factors (feature variables and weighting parameters) as expressed in the following equation (16). In this operational example, LF1, LF2 and LF3 are employed as the landmark feature variables, and DF1 and DF2 are employed as the moving feature variables.

[Equation 15]

$$fl = \sum_{}^{No} W_{LF1} dist\left(\begin{array}{c} LF1_{xi}, LF1_{yi}, \\ DispCenterX, DispCenterY \end{array}\right) \cdot W_{LF2}LF2_i \cdot W_{LF3}LF3_i \quad (15)$$

[Equation 16]

$$fd = W_{DF1}DF1 \cdot W_{DF2}DF2 \quad (16)$$

In the equation (15), dist (LF1, DispCenter) is a function to obtain the distance (pixel) between LF1 (=(LF1$x$, LF1$y$)) and the screen center (DispCenterX, DispCenterY) as expressed in the following equation (17).

[Equation 17]

$$\text{dist} = \sqrt{(DispCenterX - LF1_x)^2 + (DispCenterY - LF1_y)^2} \quad (17)$$

The weighting parameters of the respective feature variables $W_{LFi}$ (i=1 to 3) and $W_{DFi}$ (i=1, 2) are determined in accordance with the following rules. Specifically, the weight is determined so as to have a higher importance level in the smaller straightness at the intersection. The weight is also determined so as to have a lower importance level in the lower moving speed at the intersection. The weight is also determined so as to have a higher importance level in the higher side trip level. The weight is also determined to have a higher importance level in the larger size difference of the road in turning right/left.

The weight is also determined so as to have a higher importance level in the case of the whole landmark largely displayed on the screen center. The weight is also determined so as to have a higher importance level for the landmark with the higher name recognition level. The weight is also determined so as to have a higher importance level for the landmark with the higher stability level (less blurring on the screen). The weight is also determined so as to have a lower importance level for the landmark which has been already displayed. The weight is also determined so as to have a higher importance level in the larger number of the landmark. The weight is also determined so as to have a higher importance level for the longer displayed landmark.

The video image type determining section 4 determines the comprehensive importance level of the video image scene by using the landmark scene importance level $f_1$ and the drive information scene importance level $f_d$. This comprehensive importance level of the video image scene is referred hereinafter as a comprehensive importance level ft. The video image type determining section 4 may obtain the comprehensive importance level ft in accordance with the distribution ratio which is determined in advance between the landmark scene and the drive information scene. The video image type determining section 4 may also obtain the comprehensive importance level ft in accordance with the distribution ratio which is determined by the user by corresponding to the customize axis (to be explained below). The video image type determining section 4 determines the comprehensive importance level ft in the video image scene by using the following equation (18) and the equation (19).

[Equation 18]

$$ft = W_1 f_1 + W_d f_d \quad (18)$$

[Equation 19]

$$W_1 + W_d = 1 \quad (19)$$

According to this operational example, the video image scene having the comprehensive importance level ft which is larger than a predetermined threshold value which is specified in advance is selected as an important scene and used as an object for the video image processing. To be more specific, the video image type determining section 4 determines whether or not the comprehensive importance level ft is larger than the predetermined threshold value (step S7b). When the comprehensive importance level ft is determined as larger than the predetermined threshold value, the video image type determining section 4 performs the video image type determination process for the video image scene (step S8). When the comprehensive importance level ft is determined as smaller than the predetermined threshold value, the video image processing system repeats to perform the processes of step S1 and the following steps.

Figure 15:
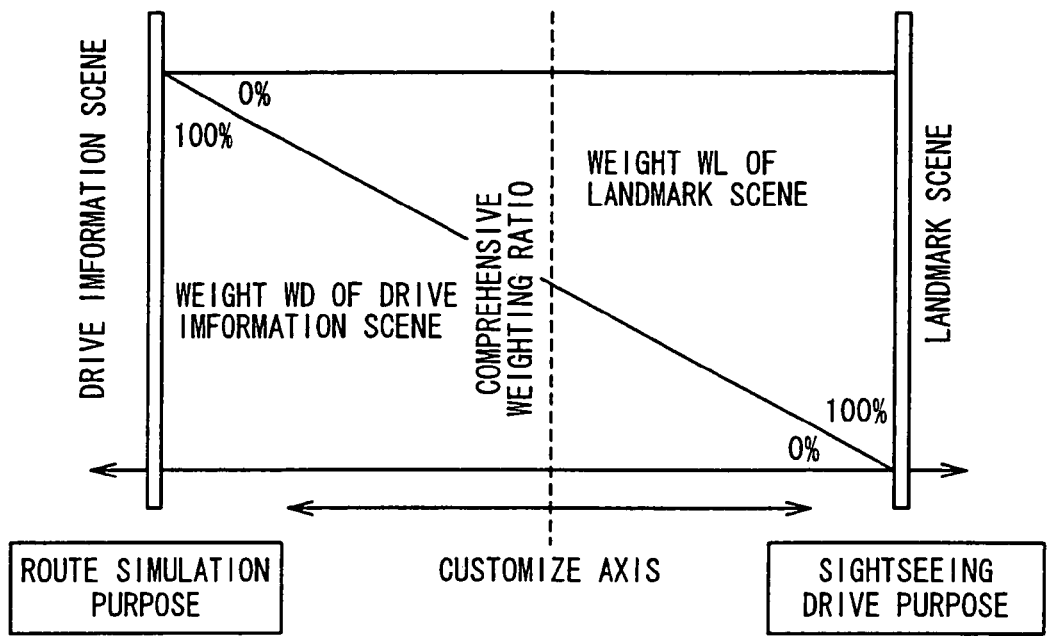
FIG. 15 is a diagram to explain data treatment of a video image processing according to the present invention.

FIG. 15 is a diagram to explain a method for determining a weighting distribution of a calculation by a customize axis which is set by the user. As show in FIG. 15, the user adjusts the customize axis in order to freely set the level (comprehensive weighting ratio) between the route simulation purpose and the sightseeing drive purpose. In other words, the weight between the route simulation purpose and the sightseeing drive purpose can be changed in accordance with the usage purpose of the user. Accordingly, it is possible to determine the importance level which is applicable to the respective usage purposes.

Figure 16:
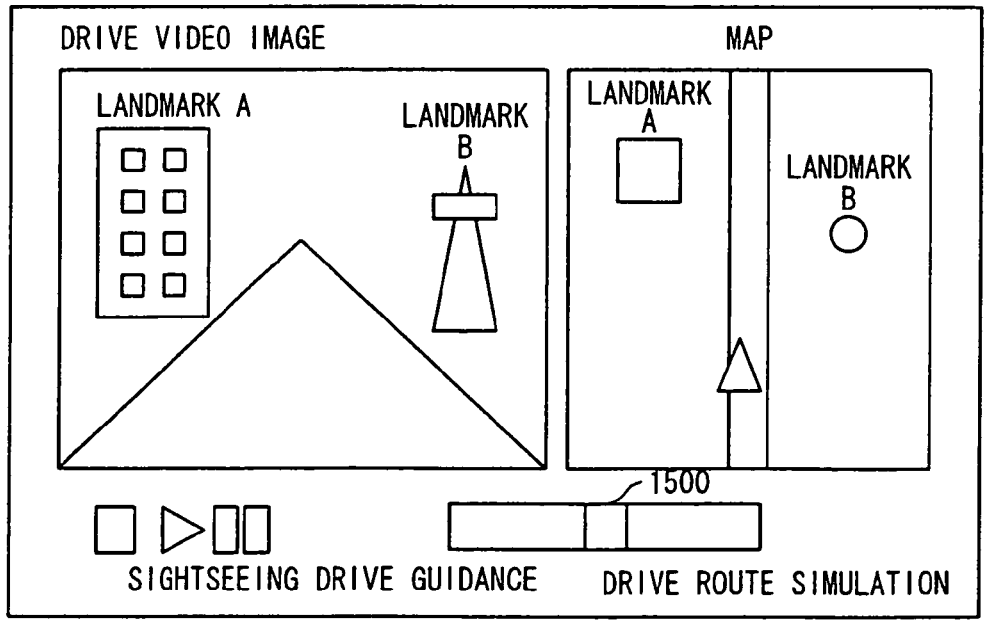
FIG. 16 is a conceptual diagram showing another example of the display screen.

As the user interface to determine the usage purpose of the user (e.g., drive route simulation and sightseeing drive guidance), slide bar may be employed. FIG. 16 shows another example of the display screen. As shown in FIG. 16, the display screen may include a switching slide bar 1500 in order to set the usage purpose.

The video image processing system according to the present invention is applicable to the purposes including, for example, a drive route simulation system such as the car navigation and a program to realize the drive route simulation. The video image processing system according to the present invention is also applicable to the purposes including an automatic digest system to effectively browse the video image contents and a program to realize an automatic digest.

The invention claimed is:

1. A video image processing system comprising:
a video image input section which inputs a video image photographed by a mobile video image photographing device;
a moving feature variable obtaining section which obtains a moving feature variable indicating a feature of said video image photographing device in a state of moving;
a video image type determining section which determines a type of a video image scene included in said video image on the basis of said moving feature variable; and
a video image processing section which determines a processing method of said video image on the basis of said type of said video image scene determined by said video image type determining section, and processes said video image on the basis of said determined processing method,
wherein said moving feature variable obtaining section includes:
a speed input section which obtains a moving speed of said video image photographing device,
a first position input section which obtains a photographing position of said video image photographing device, and
a moving feature variable calculating section which calculates a moving feature variable corresponding to said video image scene on the basis of said photographing position and said moving speed.

2. The video image processing system according to claim 1, further comprising:
a display section which displays said video image which is processed by said video image processing section.

3. The video image processing system according to claim 1, further comprising:
a route information memory section which stores route information,
wherein said moving feature variable calculating section calculates said moving feature variable corresponding to said video image scene on the basis of said route information, and said photographing position and said moving speed of said video image photographing device.

4. The video image processing system according to claim 3, wherein the route information includes at least any one of a route position, type, a number of lanes, a position of an intersection, a position of a junction, and existence of a signal.

5. The video image processing system according to claim 1, wherein said moving feature variable includes at least any one of a deviation variable between a current position of said video image photographing device and a predetermined route, a running speed, and a running straight variable.

6. The video image processing system according to claim 1, further comprising:
a landmark feature variable obtaining section which obtains a landmark feature variable indicating a feature of a landmark existing within a viewing angle of said video image,
wherein said video image type determining section determines said type of said video image scene on the basis of said landmark feature variable and said moving feature variable.

7. The video image processing system according to claim 6, wherein said landmark feature variable obtaining section includes:
a direction input section which obtains said photographing direction of said video image photographing device,
a second position input section which obtains said photographing position of said video image photographing device,
a landmark information memory section which stores landmark information including property information of said landmark, and
a landmark feature variable calculating section which calculates said landmark feature variable corresponding to said video image scene on the basis of said landmark information, said photographing position, and said photographing direction.

8. The video image processing system according to claim 7, wherein said landmark information includes a position and a form of said landmark.

9. The video image processing system according to claim 6, wherein said landmark feature variable includes at least any one of a size of said landmark on a screen and a deviation variable from a screen center.

10. The video image processing system according to claim 6, wherein said video image type determining section determines said type of said video image scene by determining whether or not said moving feature variable and said landmark feature variable are larger than threshold values.

11. The video image processing system according to claim 10, wherein said threshold values with respect to said moving feature variable and said landmark feature variable are changed depending on a usage purpose.

12. The video image processing system according to claim 6, wherein said video image type determining section calculates an importance level of said video image scene on the basis of at least one of values among said moving feature variable and said landmark feature variable, and determines said type of said video image scene when said calculated importance level is larger than a threshold value.

13. The video image processing system according to claim 1, wherein said type of said video image scene includes at least one of a turning corner scene, a landmark scene, a traffic congestion scene, a signal waiting scene, and other scene.

14. The video image processing system according to claim 13, wherein said video image processing section processes said video image so as to perform a slow replay in said video image scene which is determined as said turning corner scene, processes said video image so as to display a ticker of said landmark information in said video image scene which is determined as said landmark scene, processes said video image so as to delete said video image scene which is determined as said traffic congestion scene, processes said video image so as to delete a video image scene which is determined as said signal waiting scene, and processes said video image so as to perform a high-speed replay in said video image scene which is determined as said other scene.

15. A server of a video image processing system which processes a video image photographed by a video image photographing device, said server comprising:
a landmark information memory section which memorizes landmark information including property information of a landmark;
a landmark feature variable calculating section which calculates a landmark feature variable corresponding to a video image scene on the basis of said landmark information, and a photographing position and a photographing direction of said video image photographing device received from a terminal;
a route information memory section which memorizes route information;
a moving feature variable calculating section which calculates a moving feature variable corresponding to said video image scene on the basis of said route information, and said photographing position and said moving speed of said video image photographing device received from said terminal;
a video image type determining section which determines a type of said video image scene on the basis of said landmark feature variable and said moving feature variable;
a video image processing section which determines a processing method of said video image on the basis of said type of said video image scene, and processes said video image on the basis of said determined processing method; and
a server-side transmission section which transmits said video image processed by said video image processing section to said terminal via a communication network.

16. A server of a video image processing system which processes a video image photographed by a video image photographing device, said server comprising:
a landmark information memory section which memorizes landmark information including property information of a landmark;
a landmark feature variable calculating section which calculates a landmark feature variable corresponding to a video image scene on the basis of said landmark information, and a photographing position and a photographing direction of said video image photographing device received from a terminal;

a route information memory section which memorizes route information, a moving feature variable calculating section which calculates a moving feature variable corresponding to said video image scene on the basis of said route information, and said photographing position and said moving speed of said video image photographing device received from said terminal, a video image type determining section which determines a type of said video image scene on the basis of said landmark feature variable and said moving feature variable, and a server-side transmission section which transmits said type of said video image scene to said terminal via a communication network.

17. A terminal of a video image processing system which processes a video image photographed by a video image photographing device, said terminal comprising:

a video image input section which inputs said video image;

a direction input section which inputs a photographing direction of said video image photographing device;

a position input section which inputs a photographing position of said video image photographing device;

a speed input section which inputs a moving speed of said video image photographing device;

a terminal-side transmission section which transmits said photographing direction, said photographing position and said moving speed to a server that determines a type of a video image scene via a communication network;

a video image processing section which determines a method to process said video image on the basis of said type of said video image scene received from said server, and processes said video image on the basis of said determined processing method; and a video image display section which displays said video image processed by said video image processing section.

18. A video image processing method comprising:

inputting a video image photographed by a mobile video image photographing device;

obtaining a moving feature variable indicating a feature of said video image photographing device in a state of moving;

obtaining a landmark feature variable indicating a feature of a landmark existing within a viewing angle of said video image;

determining a type of a video image scene included in said video image on the basis of said moving feature variable and said landmark feature variable; and determining a processing method of said video image on the basis of said type of said video image scene, and processing said video image on the basis of said determined processing method.

19. A video image processing program stored on a computer readable medium comprising code that, when executed, causes a computer to perform:

inputting a video image photographed by a mobile video image photographing device;

obtaining a moving feature variable indicating a feature of said video image photographing device in a state of moving;

obtaining a landmark feature variable indicating a feature of a landmark existing within a viewing angle of said video image;

determining a type of a video image scene included in said video image on the basis of said moving feature variable and said landmark feature variable; and determining a method to process said video image on the basis of said type of said video image scene, and processing said video image on the basis of said determined processing method.

* * * * *